United States Patent
Tushinsky et al.

(10) Patent No.: US 7,203,524 B2
(45) Date of Patent: *Apr. 10, 2007

(54) ARTICLE WITH WIRELESS SIGNAL ALERTING DEVICE

(76) Inventors: Robert J. Tushinsky, 10304 Spicewood Pkwy., Austin, TX (US) 78750; Benjamin Rozwood, 300 W. Beech St. #303, San Diego, CA (US) 92101; David C. Cadis, 4901 Amingo Ave., Tarzana, CA (US) 91356

( * ) Notice: Subject to any disclaimer, the term of this patent is extended or adjusted under 35 U.S.C. 154(b) by 0 days.

This patent is subject to a terminal disclaimer.

(21) Appl. No.: 11/248,835

(22) Filed: Oct. 11, 2005

(65) Prior Publication Data

US 2006/0025182 A1  Feb. 2, 2006

Related U.S. Application Data

(63) Continuation-in-part of application No. 10/997,421, filed on Nov. 23, 2004, now Pat. No. 6,954,659.

(60) Provisional application No. 60/524,595, filed on Nov. 24, 2003.

(51) Int. Cl.
*H04B 1/38* (2006.01)

(52) U.S. Cl. .............. 455/567; 455/557; 455/556.1; 340/573.4; 340/539.13; 343/702

(58) Field of Classification Search ................ 455/567, 455/557, 556.1; 340/573.4, 539.13; 343/700, 343/702

See application file for complete search history.

(56) References Cited

U.S. PATENT DOCUMENTS

| | | |
|---|---|---|
| 3,755,663 A | 8/1973 | George, Jr. |
| 3,805,047 A | 4/1974 | Dockstader |
| 4,076,976 A | 2/1978 | Fenton |
| 4,096,552 A | 6/1978 | Ben-Porat |

(Continued)

*Primary Examiner*—Danh Cong Le
(74) *Attorney, Agent, or Firm*—Connolly Bove Lodge & Hutz LLP; Jonathan A. Jaech

(57) ABSTRACT

An article for personal, vehicular or household use provides a visual alert for the presence of a mobile communication signal from a nearby but not physically connected communication device. The article includes a signaling assembly for providing a visual signal when a mobile communication signal is detected within a defined distance an antenna connected to the signaling assembly and extending from it. The signaling assembly may include a circuit module with an LED providing a visible signal when an adjacent mobile communication device is transmitting a signal within the defined distance. The defined distance is selected so as to make the article responsive only to signals from a mobile device within a user's personal space.

20 Claims, 26 Drawing Sheets

U.S. PATENT DOCUMENTS

| | | |
|---|---|---|
| 4,101,955 A | 7/1978 | DuNah |
| 4,297,677 A | 10/1981 | Lewis et al. |
| 4,421,953 A | 12/1983 | Zielinski |
| 4,769,656 A | 9/1988 | Dickey |
| 4,779,172 A | 10/1988 | Jimenez et al. |
| 4,791,536 A | 12/1988 | James |
| 4,803,487 A | 2/1989 | Willard et al. |
| 4,930,052 A | 5/1990 | Beige |
| 5,007,105 A | 4/1991 | Kudoh et al. |
| 5,201,578 A | 4/1993 | Westmoreland |
| 5,477,433 A | 12/1995 | Ohlund |
| 5,722,071 A | 2/1998 | Berg et al. |
| 5,752,203 A | 5/1998 | Yamashita |
| 5,848,362 A | 12/1998 | Yamashita |
| 5,886,669 A | 3/1999 | Kita |
| 5,896,096 A | 4/1999 | Kim |
| 5,960,367 A | 9/1999 | Kita |
| 6,164,815 A | 12/2000 | Degonda |
| 6,175,729 B1 | 1/2001 | He et al. |
| 6,181,237 B1 | 1/2001 | Gehlot |
| 6,184,796 B1 | 2/2001 | Rivero et al. |
| 6,218,958 B1 | 4/2001 | Eichstaedt et al. ........... 340/7.6 |
| 6,238,119 B1 | 5/2001 | Liu |
| 6,249,222 B1 | 6/2001 | Gehlot |
| 6,263,218 B1 | 7/2001 | Kita ........................... 455/567 |
| 6,272,359 B1 | 8/2001 | Kivela et al. |
| 6,296,364 B1 | 10/2001 | Day et al. |
| D454,551 S | 3/2002 | Bonadei et al. |
| 6,373,439 B1 | 4/2002 | Zurcher et al. |
| 6,424,251 B1 | 7/2002 | Byrne |
| 6,578,981 B2 | 6/2003 | Jackson et al. |
| 6,594,370 B1 | 7/2003 | Anderson |
| 6,650,231 B1 | 11/2003 | Byrne |
| 6,882,870 B2 | 4/2005 | Kivela et al. ................ 455/567 |
| 2001/0023195 A1* | 9/2001 | Higuchi et al. .............. 455/567 |
| 2002/0032020 A1 | 3/2002 | Brown et al. ................ 455/414 |
| 2002/0086714 A1 | 7/2002 | Wang |
| 2002/0115478 A1 | 8/2002 | Fujisawa et al. |
| 2002/0186122 A1 | 12/2002 | Gehlot |
| 2004/0031287 A1 | 2/2004 | Leason et al. |
| 2004/0057578 A1 | 3/2004 | Brewer ...................... 379/33.1 |
| 2004/0080421 A1* | 4/2004 | Wunderlich ............... 340/573.4 |
| 2004/0185915 A1 | 9/2004 | Ihara et al. ............... 455/569.1 |
| 2004/0189465 A1* | 9/2004 | Capobianco et al. .. 340/539.23 |
| 2004/0204151 A1* | 10/2004 | Muthuswamy et al. ..... 455/567 |
| 2004/0204153 A1* | 10/2004 | Benco et al. ................ 455/567 |

\* cited by examiner

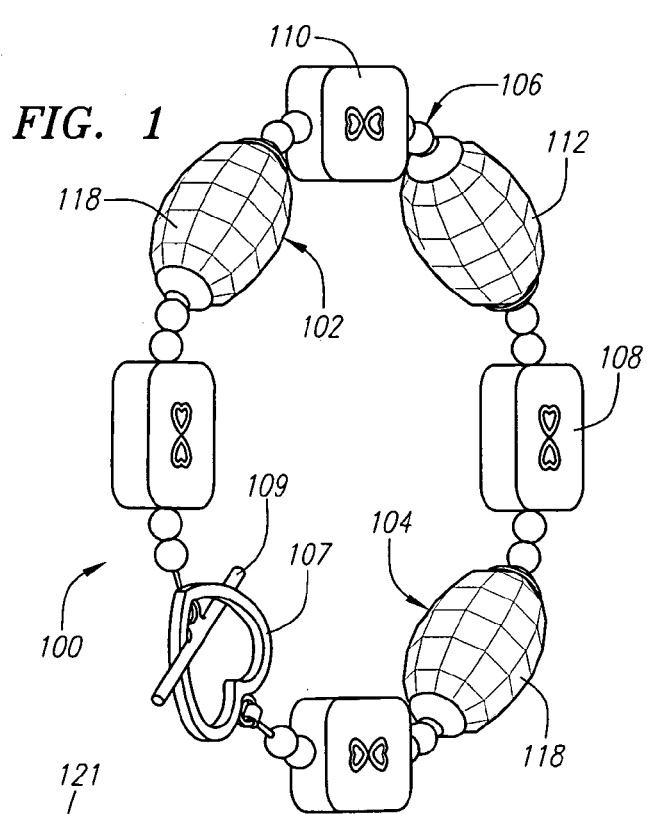
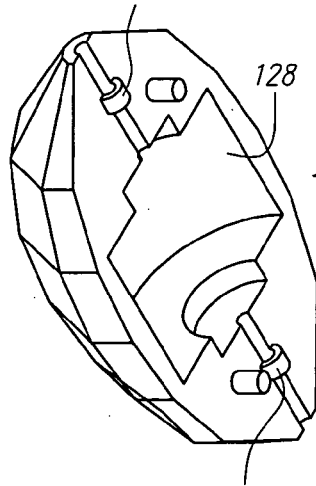
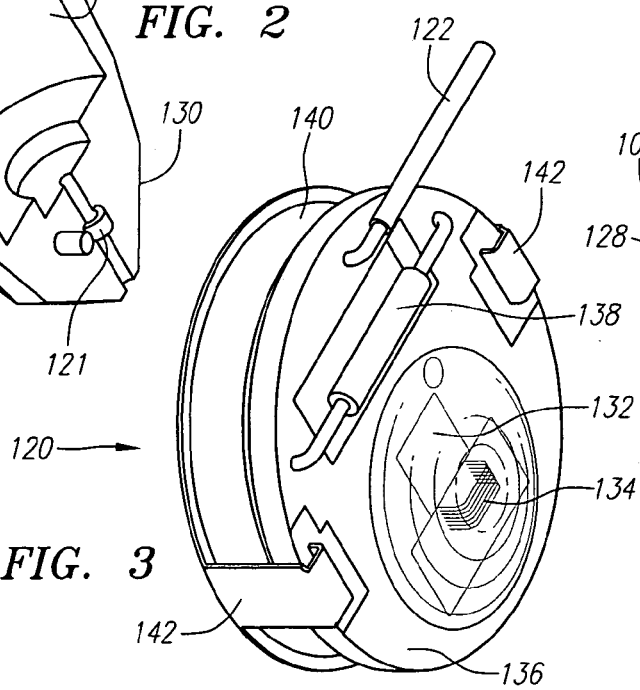
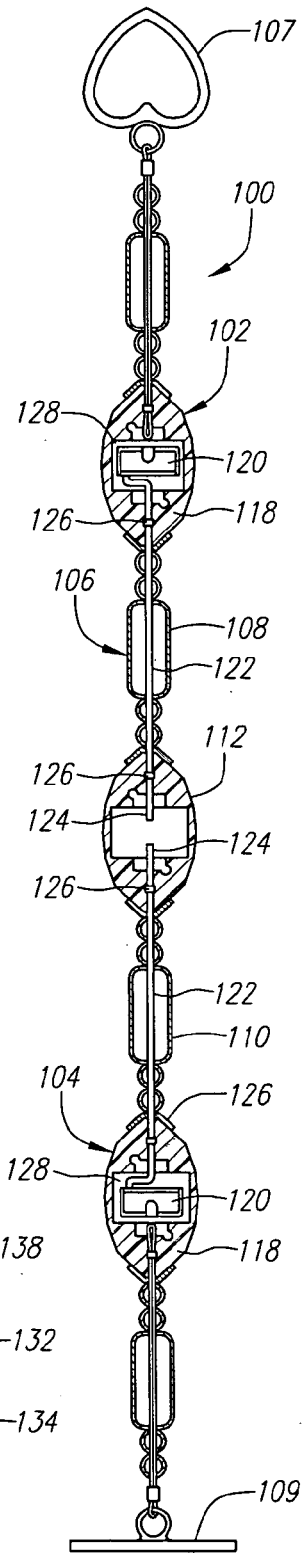
FIG. 1
FIG. 2
FIG. 3
FIG. 4

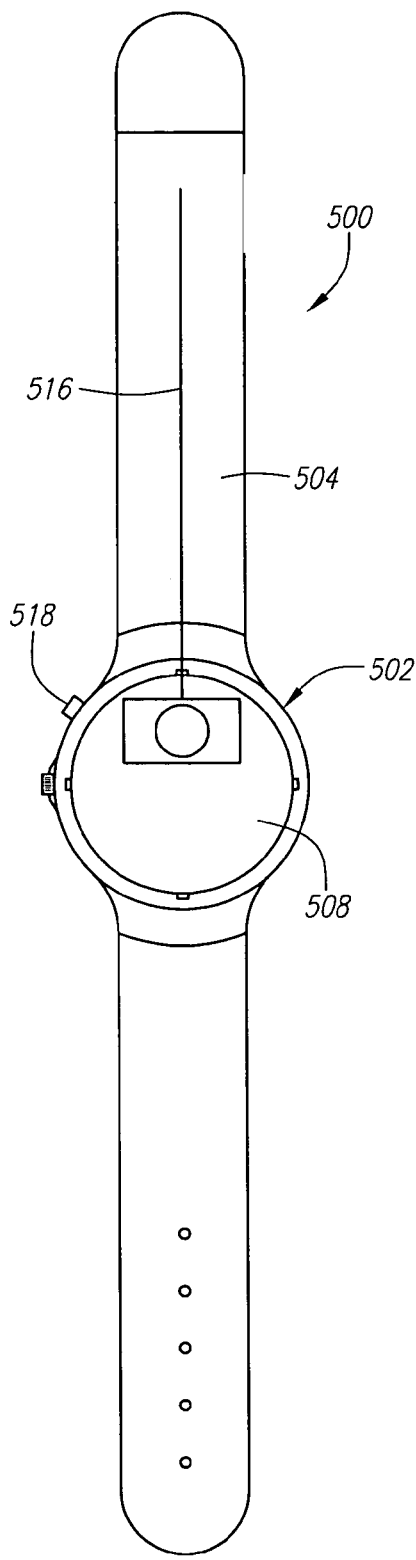
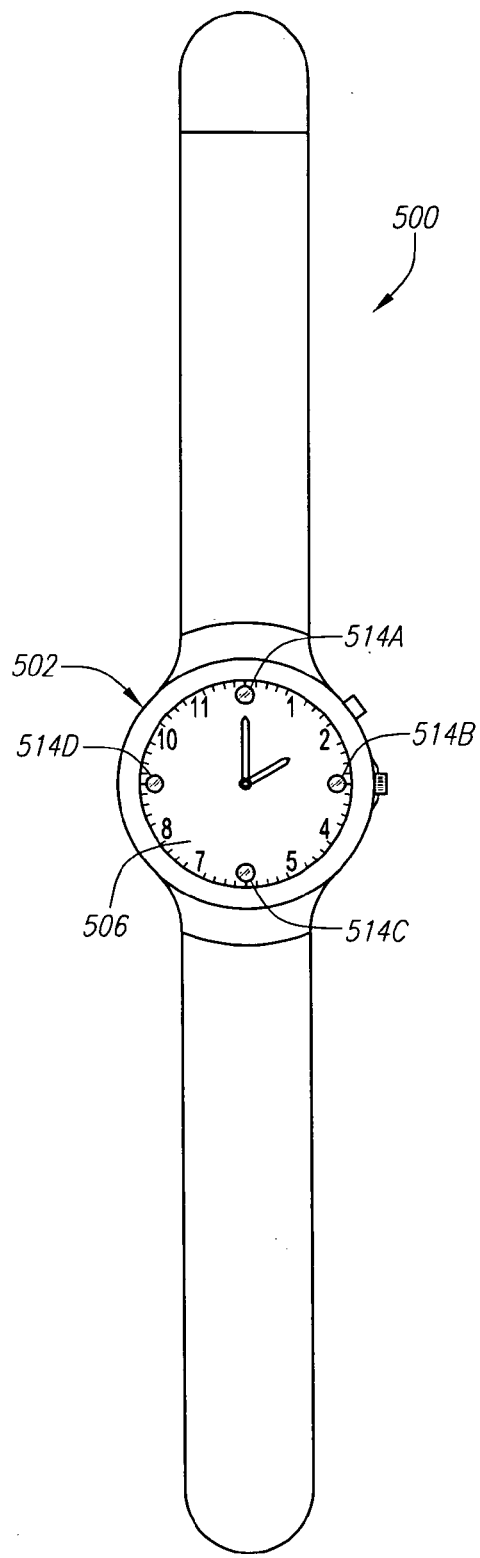
FIG. 8A
FIG. 8B

ARTICLE WITH WIRELESS SIGNAL ALERTING DEVICE

CROSS-REFERENCE TO RELATED APPLICATION

This application is a continuation-in-part of application Ser. No. 10/997,421, filed Nov. 23, 2004 now U.S. Pat. No. 6,954,659, which claims priority pursuant to 35 U.S.C. § 119(e) to U.S. Provisional Application No. 60/524,595, filed Nov. 24, 2003, which applications are specifically incorporated herein, in their entirety, by reference.

BACKGROUND OF THE INVENTION

1. Field of the Invention

The present invention relates to articles or accessories that incorporate electronic circuitry, and more particularly, to articles or accessories with circuitry for alerting the wearer to the presence of a wireless communication signal such as generated by a mobile telephone.

2. Description of Related Art

Mobile telephones and similar wireless communication devices are in widespread use today. Such telephones typically employ an audible signal, such as a ring tone, to alert the user of incoming calls. Other signals, such as vibratory alerts, may also be employed for this purpose. A signal such as a flashing light may also be used, but is not useful when the mobile telephone is carried so as to render a light invisible to the user, such as in a pocket, purse or other receptacle, or otherwise out of a user's line of sight.

In addition, the use of audible or vibratory signals is discouraged or prohibited in many circumstances. For example, in classrooms, meetings, movies and other quiet environments, users of mobile phones may desire or be required to turn off audible or vibratory alerts. In other environments, for example in a dance club, at a concert, or factory floor, the mobile phone user may be too distracted by noise or other activity to notice an audible or vibratory signal. Either way—if the phone signal is turned off or simply not noticed by the user—incoming calls may be missed or unintentionally ignored.

Compact circuitry for illuminating a light, such as an LED, in the presence of an wireless communication device is known in the art. Such circuitry has been incorporated, for example, in the body of a pen. Lacking the more complex processor of the mobile communication device, prior-art compact wireless alert circuitry will react to the presence of any wireless signal within its range of sensitivity. Therefore, a device equipped with the circuitry will alert the user not only when the user receives a call, but also anytime a mobile telephone within its range of sensitivity is in use. Generally, such non-specific sensitivity is undesirable. On the other hand, if the circuitry is not sufficiently sensitive, it will fail to sense an incoming call even if the user's mobile phone is only a short distance away, such as in a nearby purse. In other words, it is desirable to provide a signaling device that will be activated by the user's own cellular phone but not others.

In this regard, a "personal space" may be defined as a space in which the user's own mobile communication device will usually be the only device present. For example, a personal space for a person's body may be defined as the space within about three feet of the person's body, whereas a personal space for a user's room or home may be larger. Within the applicable personal space, it should be possible to use less expensive non-specific alerting circuitry (i.e., circuitry responsive to signals from different mobile communication devices), without responding to most or all signals from mobile communication devices other than the user's. For example, with a fashion accessory designed to be placed on or near the user's body, sensitivity to about three feet away, but not substantially beyond three feet, should usually be compatible with the user's personal space. It is desirable, therefore, to control the sensitivity of non-specific alert circuitry to respond to mobile communication devices placed within a defined distance of the alert circuitry.

An alert circuit's sensitivity to wireless signals is at least partially determined by the dimensions and configuration of its connected antenna for the wireless signal. For example, if the antenna is too short, it will not be sufficiently sensitive, and will not reliably pick up signals from the user's telephone. If it is too long, it will be too sensitive, picking up signals from too large an area. It may be difficult to accommodate an antenna of suitable length and configuration many small articles. For example, fashion accessories such as costume jewelry may often impose design constraints that may make it difficult to accommodate a suitably-sized antenna.

It is desirable, therefore, to provide articles of various types for alerting the wearer to the presence of an incoming call using a visual signal, such as a blinking or steady light. The article should be configured to alert the user to a wireless communication signal from a mobile telephone, pager or similar device within the user's personal space. For example, the article may be responsive within about a three-foot distance from a user's cell phone, but not to signals from cell phones more than about three feet away. The article may be small enough to wear or carry as a portable, or may be designed to stay in a particular location, such as a home, vehicle, bedroom, or office.

SUMMARY OF THE INVENTION

The present invention provides various articles or accessories that overcome the limitations of the prior art. Articles or accessories according to the invention may include, for example, fashion accessories such as bracelets, brooches, clasps, rings, anklets, necklaces or clips; wristwatches or other timepieces, keychains, novelty items, belts, flashlights, mini-lights, hats, eyeglasses, sunglasses, charms, clothing, purses and handbags, desk sets, personal digital assistants (PDA's), and cases. The articles and accessories may be designed for personal, household, or vehicular use within a defined personal space of a user.

By way of example, a fashion accessory according to the invention may be configured as a single encasement, or a plurality of encasements that are strung together in a bracelet, pendant, necklace, brooch, or the like. One or more of the encasements comprises an inner cavity that holds a compact sensor chip, miniature battery, and LED integrated into an alerting circuit module. An encasement may comprise, for example, a ornamental bead, block or crystal, a housing for a timepiece, rubber or plastic tubing, a decorative band, or the like. The bead or other encasement is comprised at least partially of a transparent or translucent material, such as plastic or glass, so as to transmit light from the LED. The LED is configured to illuminate when the sensor detects a wireless communication signal within the range of frequencies and signal strength that it is sensitive to. Hence, the case enclosing the alerting circuit module is conveniently referred to herein as an "illuminated case." In this embodiment, the illuminated case may be of any shape that is aesthetically pleasing and wearable as a fashion accessory. The sensor chip is connected to an antenna that is strung through one or more passive (non-illuminated) beads or other decorative housing. Optionally, the antenna may be used both as a mechanical structure for stringing beads or other cases and as an antenna for the alerting circuit module. A suitable antenna for personal jewelry may be, for example, between about one inch and four inches in length.

Each illuminated case, alerting circuit module and its associated antenna, optionally strung through a plurality of passive beads or other structural or decorative housings, comprises an alerting accessory module. A single accessory module may be attached to any suitable structure for holding jewelry, for example, a pin, clasp, or the like, to provide a fashion accessory for alerting its wearer to the presence of a wireless communication signal in the vicinity of the wearer. Two or more alerting accessory modules may be strung together to form a bracelet, anklet, pendant, necklace, or the like. Because wireless communication signals are directional in nature, the combination of two or more alerting accessory modules in a single fashion accessory may increase the functionality of the accessory, by increasing the probability that at least one of the modules will be favorably oriented for sensing a nearby signaling telephone.

Advantageously, a fashion accessory according to the invention may be made of suitably inexpensive materials, for example, plastics or non-precious metals, so that the accessory may be regarded as disposable, and simply discarded when the battery life is spent. In the alternative, the illuminated case may be designed to be opened after assembly, so that the alert circuit module can be accessed for battery replacement.

Thus, a person wearing a fashion accessory will receive a visual signal by illumination of the LED when her mobile telephone receives an incoming phone signal. This may be used to alert the user to an incoming call when the mobile phone alert is off or is not loud enough to be heard in a noisy environment, or if in a vibrating alert mode, is not in contact with the user. In addition, some users may find that the illuminating accessories are attractive and fun to wear, regardless of their other functions.

The alert circuit may be adapted for use with a variety of other personal articles. As with fashion accessories, other personal articles may be designed having sensitivity to cellular signals within a user's personal space. The size of personal space may depend on the intended environment for the article. For example, an article intended to remain in a user's private residence or office may be designed for sensitivity to cellular signals over a larger area. A desk set, for example, may be sensitive to signals within a 20 foot radius for sensitivity within an office space. A wall clock may be sensitive to signals over a greater area, such as a 50 foot radius, for sensitivity within a house. Greater or lesser sizes of personal space may also be appropriate. To ensure that an appropriate personal space is established for adequate sensitivity without oversensitivity to extraneous signals, an article with alert circuitry may be provided with a manual sensitivity adjustment.

A more complete understanding of the personal article with wireless signal alerting device will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 1 is a perspective view of an exemplary fashion accessory according to the invention.

FIG. 2 is a cross-sectional view of the accessory shown in FIG. 1.

FIG. 3 is an enlarged perspective view of an exemplary alert circuit module for mounting inside of an illuminated case, excluding its attached antenna.

FIG. 4 is an enlarged perspective view of one-half of an exemplary illuminated case from the accessory shown in FIG. 1.

FIGS. 8A and 8B are back and front views, respectively, showing a wristwatch with alert circuitry according to the invention.

DETAILED DESCRIPTION OF THE PREFERRED EMBODIMENT

Figure 5:
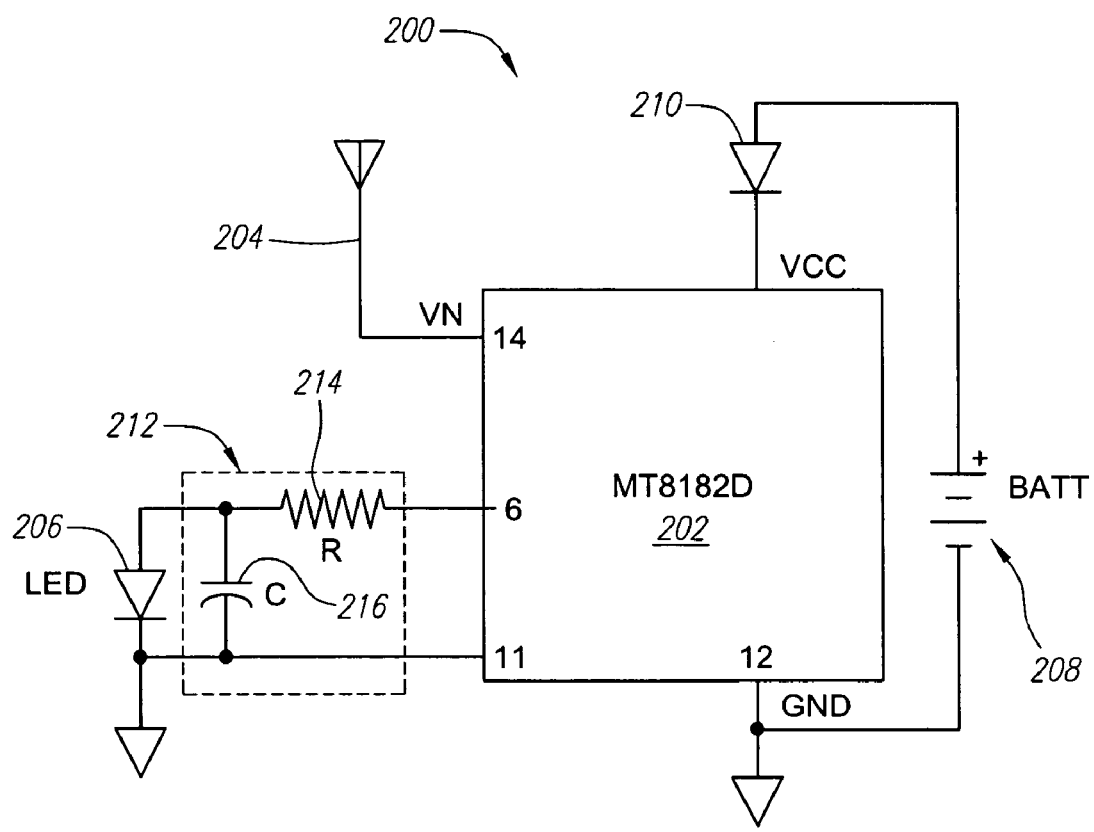
FIG. 5 is a circuit diagram showing an exemplary alert circuit according to the invention.

The present invention provides an article or accessory with a wireless alerting device for personal, household, or vehicular use, that overcomes the limitations of the prior art. In the detailed description that follows, like numerals are used to indicate like elements appearing in one or more of the figures.

Referring to FIGS. 1 and 2, in an embodiment of the invention, a fashion accessory 100 is configured as a bracelet. Accessory 100 includes a first signaling assembly 102 connected to a second signaling assembly 104 via an elongated member 106, for example, a strap, cord, tube or chain. In the illustrated embodiment, the elongated member comprises and is henceforth referred to as an ornamented chain 106. Chain 106 is divided into first and second portions 108, 110 by a central case 112. Clasps portions 107, 109 may be provided at opposite ends of the ornamented chain for forming a loop of the accessory 100. The ornamental clasp depicted is merely exemplary, and any suitable clasp may be used. First and second assemblies 102, 104 may be substantially identical, each comprising an ornamented bead 118 holding a circuit module 120. The circuit module is configured to activate a light-emitting diode (LED) when the presence of a mobile communication signal from a nearby device is sensed. Circuit modules for this purpose are known in the art. The LED may selected so as to illuminate in any visible color (e.g., red, orange, yellow, green, blue, indigo, violet and white) for which an LED is available.

Each of the first and second signaling assemblies 102, 104 further includes an antenna 122 connected to circuit module 120. A ring 121 or other retainer attached to case 130 may be used to hold the antenna 122 and circuit module 120 in place, when the case is opened replace the battery. Preferably, antenna 122 is selected to have an end-to-end length and geometric configuration that is appropriate for imparting the desired signal sensitivity to the fashion accessory. Different antenna lengths and configurations may be appropriate, depending on various factors, including, for example, the characteristics of the mobile communication signal to be sensed, the desired range of sensitivity, and the design of the circuit module.

For personal use applications, it is generally desirable that the signaling assemblies be sensitive to signals emanating from a mobile communication device within about a three-foot distance from the user. This distance should permit the fashion accessory to respond to signals from the wearer's mobile communication device, without responding to signals from other devices that are not very near to the wearer of the fashion accessory; i.e., within the user's personal space. Of course, greater or lesser sensitivity to mobile communication signals may also be selected.

For example, an extended, substantially linear antenna length between about one to four inches is believed suitable for jewelry designed for use with typical mobile communication devices within the United States. Suitable materials for antenna 122 may include one or more conductive wires, for example, single-strand or multi-stranded wires of copper or aluminum alloys as known in the art. In an embodiment of the invention, the antenna is comprised of at least five copper wires entwined together for strength, then coated with a flexible plastic material for added strength and protection.

The antenna 122 should be configured to extend from the circuit module 120 in a substantially linear configuration. To accommodate the excess antenna length, a distal portion of the antenna may be threaded inside or alongside the ornamented chain 106. A distal end 124 of antenna 122 may be anchored inside an adjacent bead 112. In the depicted embodiment, the central bead 122 does not contain a circuit module, although it is of the same design as beads 118. In the alternative, the anchoring central bead 112 may contain a circuit module with an LED signal, or may incorporate an alternative design.

Anchoring collars or beads 126, or any other suitable fastener, may be used to attach the distal ends 124 of antenna 122 to adjacent beads of accessory 100. For example, anchor 126 may be crimped to the antenna wire and engaged with a holdfast in the central bead 112. If the antenna is made of a sufficiently strong material, antenna 122 may also serve as a structural connector for stringing beads of the accessory 100. Stress may thereby be relieved from chain 106, which consequently may be made lighter or of weaker materials than might otherwise be possible. Chain 106 may comprise a hollow interior extending from end-to-end, through which the antenna may be threaded, as shown in FIG. 2. In the alternative, the antenna may be strung at least partially along an exterior of the connecting chain (not shown).

For a simpler look, the connecting chain may be omitted entirely, and the connecting load may be borne entirely by the antenna. In such case, the antenna may be used to string unlighted ornamental beads between the lighted ornamental cases 118. In addition, or in the alternative, the antenna may be strung inside a plastic or rubber tube, or through a flat decorative band. The tube or band may have an ornamental design, and/or may be inserted through ornamental charms or beads. For a timepiece, the antenna may extend from a central case in or adjacent to a wrist band or carrying strap.

In addition to antenna length, sensitivity may also be affected by antenna orientation. Fashion accessories may shift frequently with movements of the users, and the orientation of the antenna is unpredictable. To improve the probability that at least one signaling assembly will be connected to a properly oriented antenna, two or more independent signaling assemblies may be combined in a single fashion accessory. For example, FIGS. 1 and 2 show a bracelet with two signaling assemblies 102, 104 each having its own antenna. When configured as a bracelet with clasp portion 107, 109 engaged as shown in FIG. 1, the antennas connected to the respective signaling assemblies 102, 104 will naturally tend to be in different orientations.

FIG. 3 shows an enlarged view of an exemplary circuit module 120. The module comprises a semiconductor chip 132 containing the logic for switching power to an LED 134 when antenna 122 receives a sufficiently strong communication signal. Various suitable chips are commercially available, and one of ordinary skill may devise a suitable chip. The chip 132, LED 134, and any other necessary components such as resistor 138 may be mounted on a board 136. To facilitate installation inside of a round bead, board 136 may be circular in shape. A battery 140, which is also circular and has approximately the same diameter as board 136, may be clipped to the board using clips 142. The entire module 120 is compact and small enough to fit inside the structural or decorative case of a fashion accessory, such as inside an ornamental bead of the depicted embodiment. For example, the module including the battery may be about 0.25 inches thick and about 0.38 inches in diameter. Smaller or larger sizes may also be used.

Beads 118 may be molded in two halves, and provided with an interior compartment 128 for holding a circuit module 120. FIG. 4 shows a half 130 of an exemplary bead 118. To form a bead 118, half 130 may be mated with a complementary half (not shown). The bead halves may be configured to permit disassembly and reassembly without damaging the bead halves. This may permit servicing of the circuit module enclosed in the bead, such as battery replacement, if desired. Various plastic materials as known in the art for fashion accessories may be suitable for beads 118. At least a portion of the beads or other encasement 118 should be translucent or transparent to transmit light from the circuit module 120 to an exterior of the bead. In the depicted embodiment, beads 118 are fashioned entirely of translucent materials.

FIG. 5 is a diagram of an exemplary alert circuit 200 according to the invention. Integrated circuit 202 comprises a suitable chip as known in the art, having at least one input for attaching an antenna, and providing at least one output for activating an LED when an RF signal is picked up by an antenna connected to the antenna input. In circuit 200, any suitable antenna 204 as described herein may be attached to an input terminal of chip 202. An LED 206 is attached across output terminals of chip 202 and to ground. A suitable power source, such as a battery 208, is attached to power terminals of the chip. For example, battery 208 may comprise a 3 Volt lithium ion battery. Optionally, a diode 210 may be placed in the circuit between the power source and the chip, to prevent unintentional supply of power having the wrong polarity.

Circuit 200 may be vulnerable to generating false alerts from static interference picked up by antenna 204. For example, motion of a wearer's body may cause RF pulses to be detected and signaled by LED 206. To prevent such false alerts, a filter 212 may be placed across the terminals of LED 206. Filter 212 may be configured to absorb very brief pulses of energy to the LED, thereby preventing it from illuminating in response to interference picked up by antenna 204. When a more sustained RF signal such as from a mobile communication device is picked up by the antenna, filter 212 passes the resulting more sustained energy pulse from chip 202, causing the LED to illuminate.

To configure filter 212, resistor 214 should be selected based on the current and voltage required to illuminate the LED in comparison to the current and voltage supplied by chip 202. It may be advantageous to select a resistor having as much resistance as possible, without noticeably impeding illumination of the LED. For example, a resistor value in the range of about 100 Ω may be suitable for many applications. Then, a capacitor 216 should be selected based on the value of the resistor and the desired filtering frequency. It may be advantageous to select a value for capacitor 216 that is as small as possible, while still effectively filtering out pulses having a frequency less than the desired filtering threshold. One of ordinary skill may select suitable values for resistor 214 and capacitor 216, based on the factors described above.

Advantageously, a user need not make any modifications to her cellular telephone or other communication device to make use of an alerting accessory according to the invention. Circuit 200 may be configured to receive signals within 800-1900 MHz on global system for mobile communications (GSM) and time division multiple access (TDMA) methods of digital wireless communications transmission. When an incoming call is received using these methods, the receiving device generates a return acknowledgement or "handshake" as known in the art. The strength of the outgoing handshake signal is strongest immediately adjacent to the antenna of the cellular telephone, and diminishes with distance.

Circuit 200 may be configured to respond to the handshake generated by the user's mobile phone. Hence, the user may be alerted as to the presence of an incoming communication signal without being required to carry the communication device. The cellular telephone can be in a purse or backpack or anywhere else within the user's personal space, and the circuit will indicate the presence of an incoming call by illuminating the LED, such as by flashing.

Figure 6:
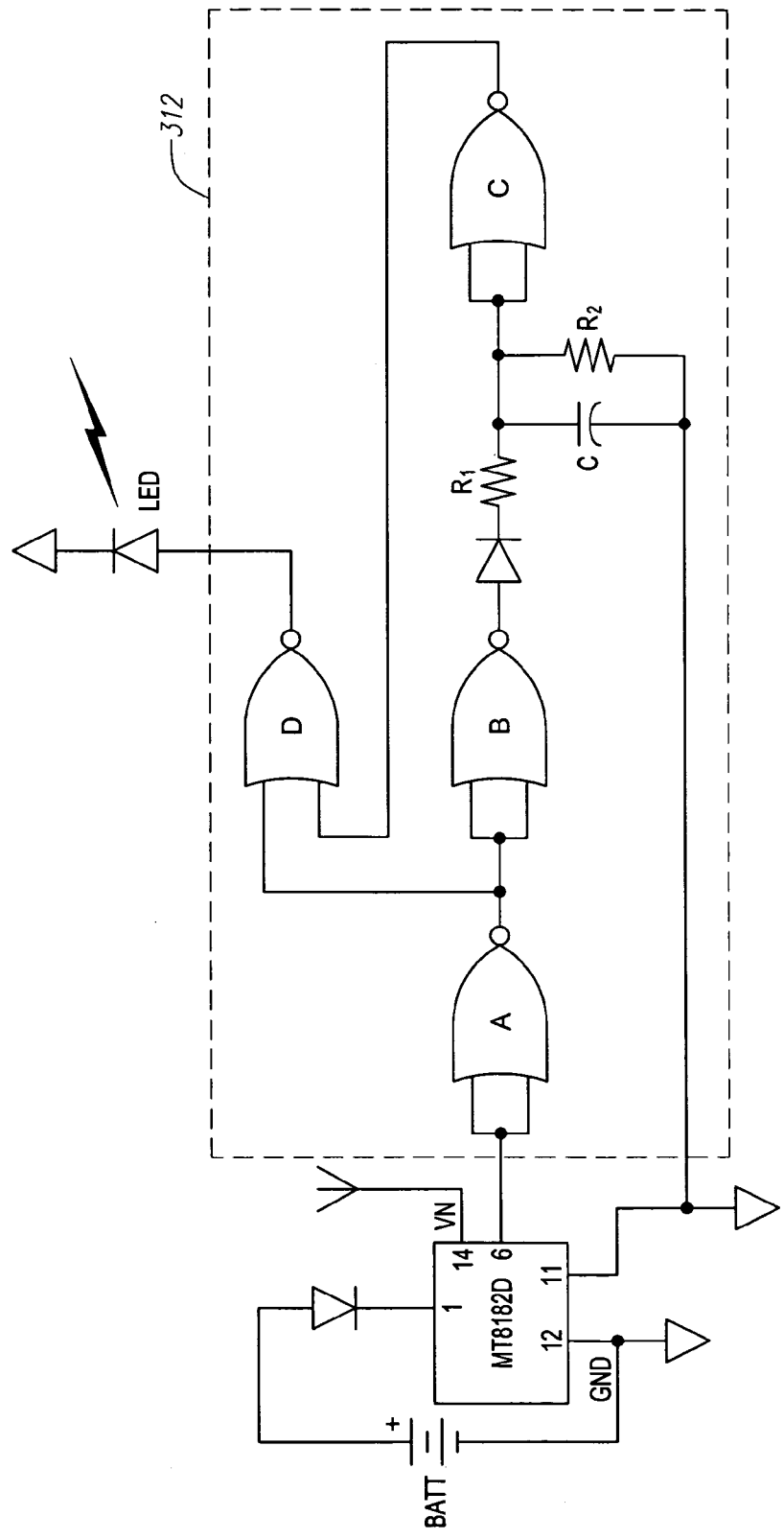
FIG. 6 is a circuit diagram showing an exemplary alert circuit according to an alternative embodiment of the invention.

FIG. 6 shows an alert circuit 300 according to an alternative embodiment of the invention. Circuit 300 comprises a filter 312 similar to filter 212, but further incorporating a plurality of NOR gates A–D, such as may be provided on a CMOS chip. Gates A–C are wired as inverters, and gate D as a NOR gate. Resistor R1 and capacitor C may be adjusted as previously described to prevent the LED from illuminating in response to transient noise. Resistor R2 is provided to allow capacitor C to discharge when no signal is present, and should be selected to have a resistivity much higher than R1.

Figure 7A:
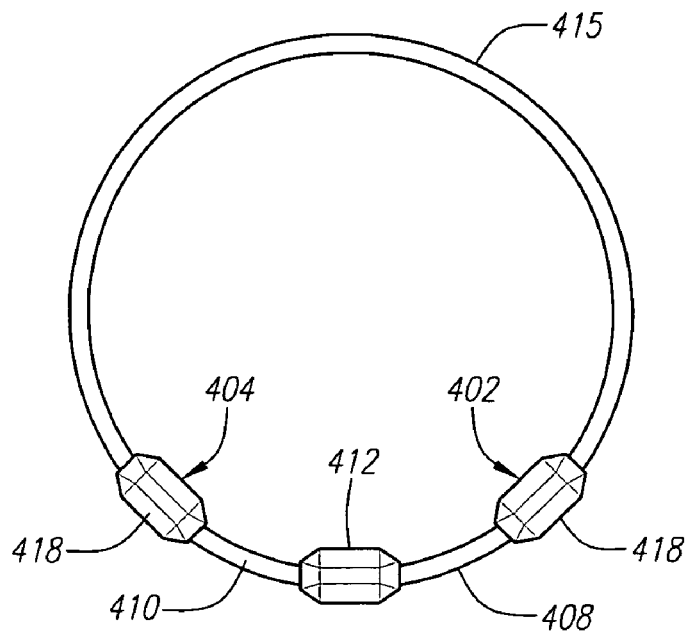
FIG. 7A is a perspective view showing an exemplary fashion accessory according to an alternative embodiment of the invention.
Figure 7B:
FIGS. 7B and 7C are detail and cross-sectional detail views showing a portion of the fashion accessory of FIG. 7A, respectively.
Figure 7C:
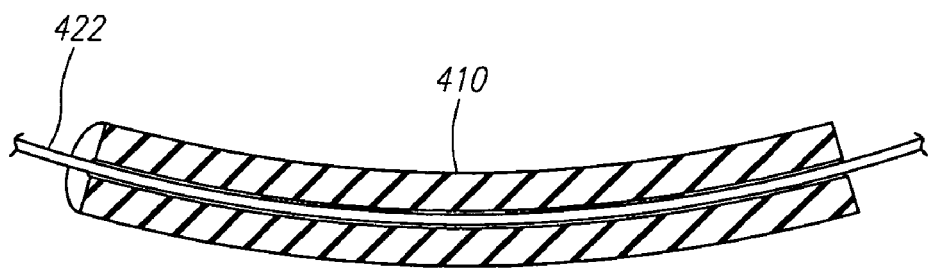

FIGS. 7A–C show a fashion accessory 400 according to an alternative embodiment, and certain details thereof. Accessory 400 comprises signaling assemblies 402, 404, which may be configured similarly to assemblies 102, 104 previously described in connection with FIGS. 1–2. For example, alert circuit modules as previously described may be housed in separate encasements 418 that are connected by respective elongated members 410, 408. An antenna may be threaded through an interior of the elongated members 410 and 408, and anchored in a central encasement 412 in a manner similar to accessory 100. In the alternative, or in addition, an antenna of suitable length may be strung through the elongated member 415 connecting assemblies 402, 404.

Accessory 400 illustrates the use of an extended antenna 422 in connection with one or more elongated members 410, 412, 415 of essentially tubular form as connecting members between signaling assemblies, or for attaching to a personal article or clothing of a user. For example, these members may comprise a structural or decorative tubing material of any desired cross-section, including but not limited to the smooth cylindrical tubing as shown. Other suitable tubing may include, for example, flattened tubing, hexagonal tubing, ribbed tubing, and so forth. Antenna 422 may be configured to run through an interior portion of such tubing. In the alternative, the antenna may be molded or formed in place with the tubing material. In either alternative, most or all of any exposed portion of the antenna may be encased by the tubular member. If selected of sufficiently strong material, antenna 422 may provide a structural connection between adjoining signaling assemblies 402, 404. In other respects, accessory 400 may be configured similarly to accessory 100, and may be modified or adapted in similar ways.

FIGS. 8A–29B show various types of exemplary personal articles adapted for use with an alert circuit according to the invention. Certain details are described for each type of article, and further details of the alert circuit as adapted to each article, and various alternative configurations, should be apparent to one or ordinary skill in view of the instant disclosure.

FIGS. 8A–B show a wristwatch 500 equipped with alert circuitry according to the invention. Watch 500 comprises a portable housing 502 and wrist band 504, formed of any suitable plastic, metallic, leather, or other material as known in the art. Housing 502 may comprise a watch face 506 for telling time and a removable back cover 508 covering an interior space holding circuitry or a mechanism for a timepiece. The interior space under cover 508 may also hold an alert circuit board 510 and battery 512. The alert circuit and battery may, in the alternative, be integrated in a single board or assembly with circuitry and a battery for the timepiece. An antenna 516 may be provided in or along wristband 504. In the alternative, a portion or all of the antenna may be disposed in or on housing 502. The antenna length is selected for sensitivity to mobile communication signals within a desired personal space.

One or more indicator lights 514A–D (four shown) connected to the alert circuit 510 may be provided on the watch face. The circuit 510 may be configured to illuminate lights 514A–D when antenna 516 is sufficiently energized by a cellular signal. A control button 518 may be provided for temporarily deactivating the alert circuit or stopping signal lights 514A–D from flashing. One of ordinary skill may adapt further details of the alert circuit as described hereinabove.

Figure 9:
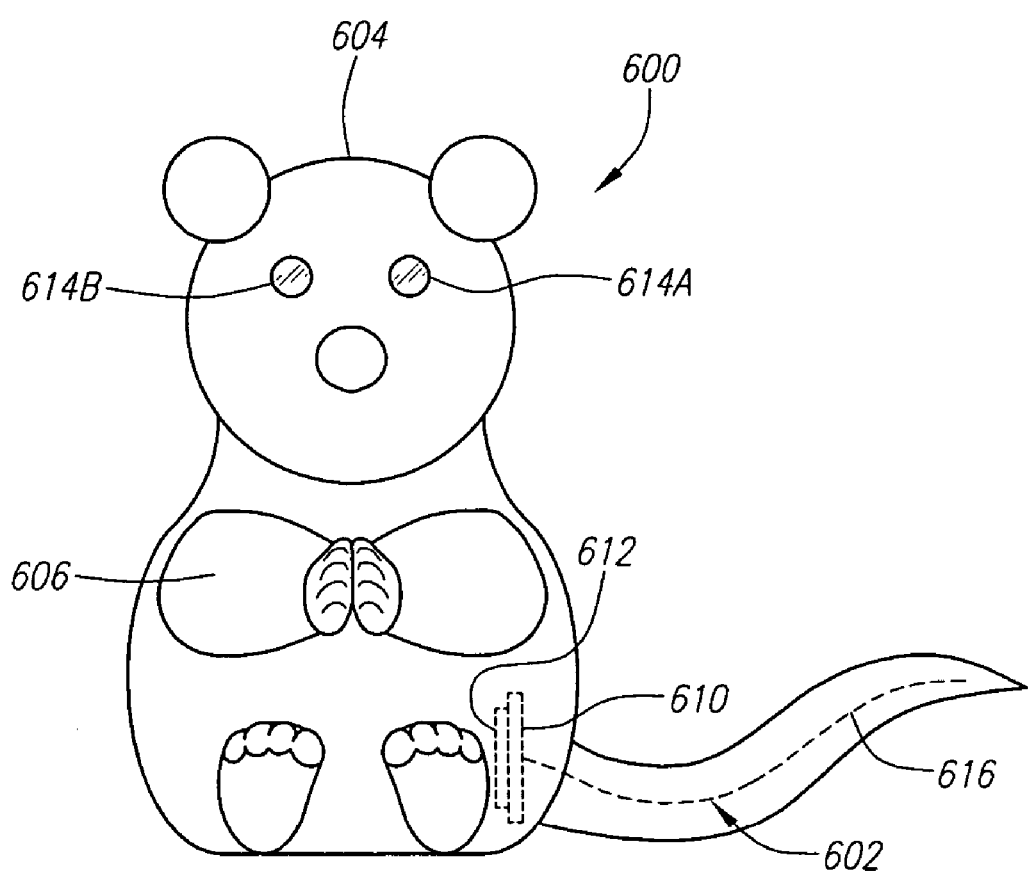
FIG. 9 is a front view showing an animal-shaped toy with alert circuitry according to the invention.

FIG. 9 shows a clip-on accessory 600 with alert circuit 602 in the form of a toy FIG. 604 comprising a portable housing for the alert circuit. A pair of appendages 606 may be configured as a clasp for grasping an article of clothing, handbag, backpack, or the like. The toy may be configured as a plush toy, plastic molded shape, or any other suitable configuration. Alert circuit 602 may comprise a circuit board 610, battery 612 and antenna 616 as previously described. The figure may be equipped with one or more LED's or lamps 614A–B, here configured as the figure's eyes, connected to the alert circuit. When antenna 616 is energized, the LED's or lamps may be illuminated.

Figure 10A:
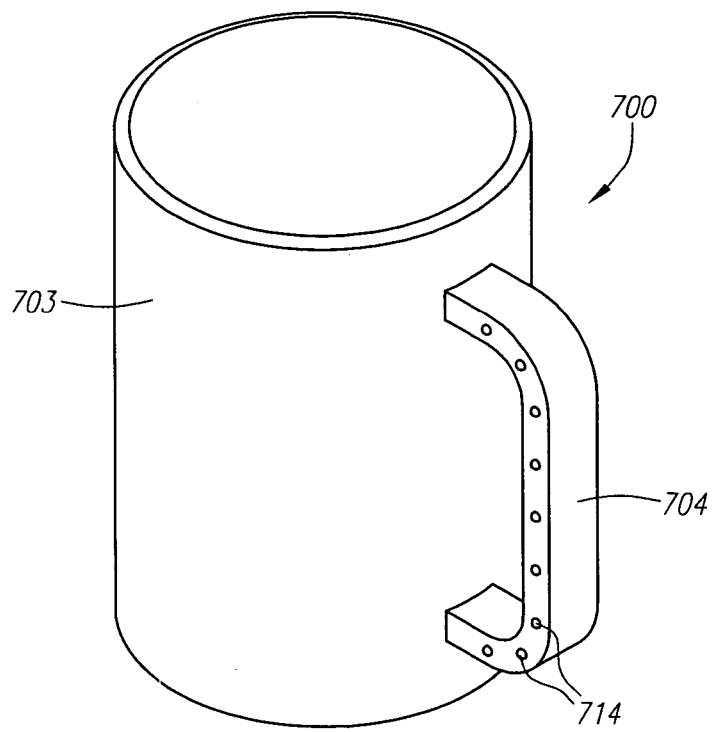
FIG. 10A is perspective view of a mug with alert circuitry according to the invention.
Figure 10B:
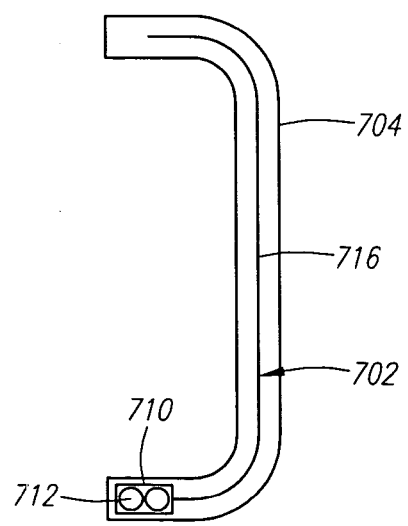
FIG. 10B is a detail view showing the alert circuitry in the handle of the mug shown in FIG. 10A.

FIG. 10A shows a mug 700, and FIG. 10A shows interior details of a handle 704 for mug 700. Mug 700 may be equipped with an alert circuit 702 housed in an interior of handle 704 attached to beverage receptacle 703. Circuit 702 may comprise a battery 712, board 710 and antenna 716 configured to activate alert lights 714 along a side of the handle. Mug 700 may comprise plastic or other suitable material.

Figure 11:
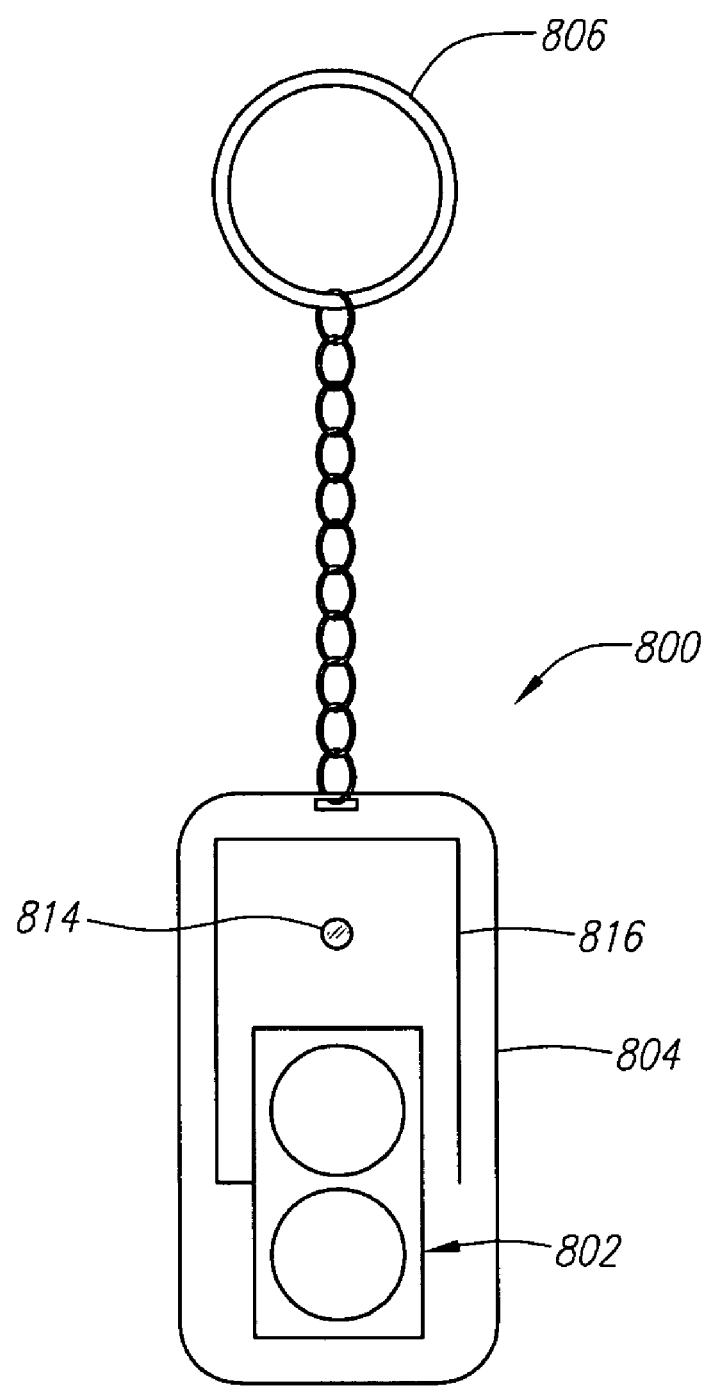
FIG. 11 is a front view showing a keychain with alert circuitry according to the invention.

FIG. 11 shows an exemplary keychain 800 with alert circuit 802 inside of a portable housing 804. Housing 804 may be secured to a key ring 806 in any suitable manner. Light 814 should be configured to illuminate when antenna 816 is activated by a mobile communication signal within a defined personal space of a user. Any number of lights may be provided, and housing 804 may comprise any desired shape.

Figure 12:
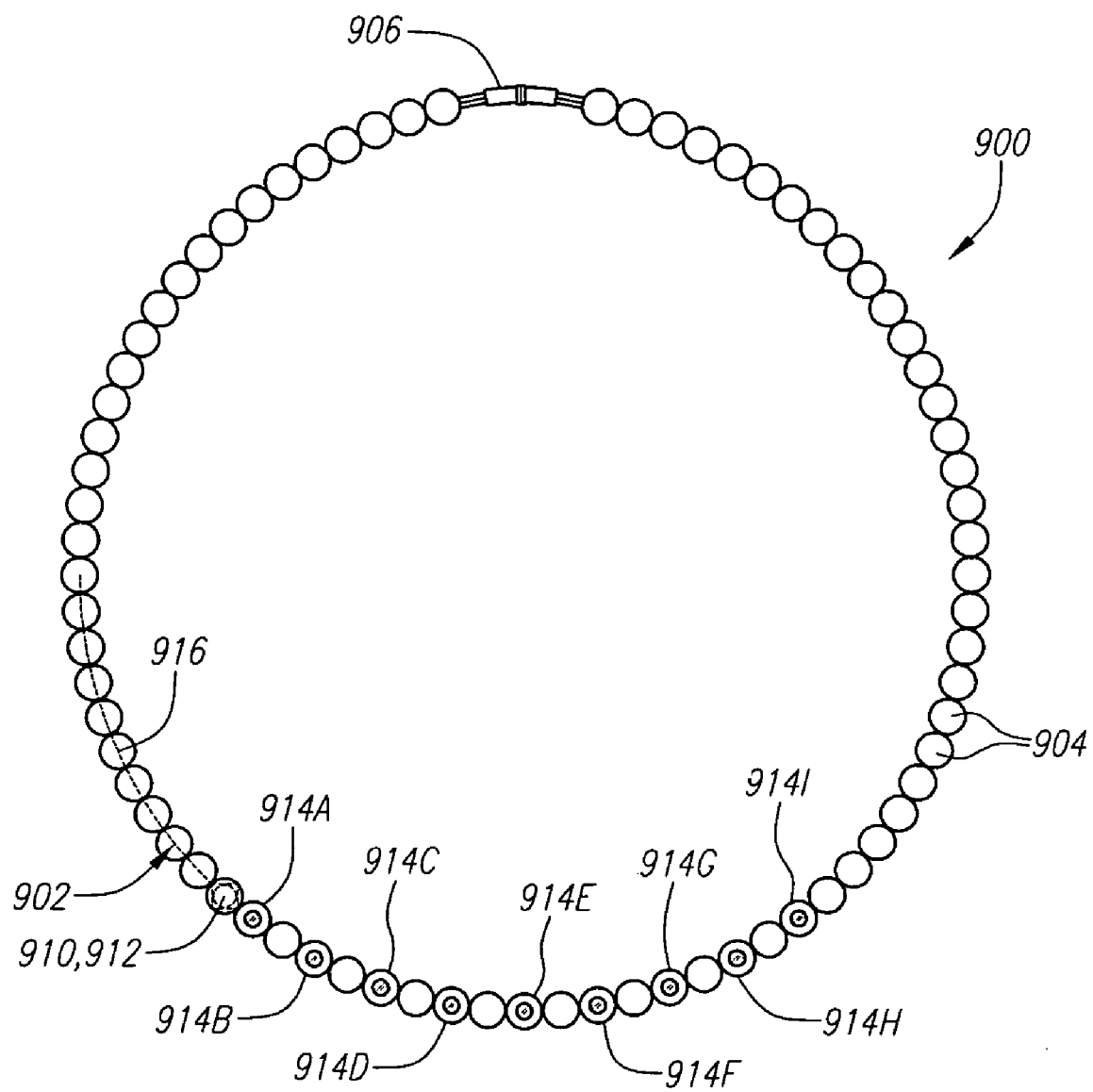
FIG. 12 is a front view showing a bracelet with alert circuitry according to the invention.

FIG. 12 shows a necklace 900 with an alert circuit 902. A string of beads 904 may be fastened by a clasp 906. An antenna of circuit 902 may be threaded through an interior space of adjacent beads. A battery 912 and circuit device 910 may be housed in one or more beads in the string. Lights 914A–l are connected to the alert circuit and configured to illuminate when a mobile signal energizes antenna 916. Any number of lights may be strung in a pattern with non-illuminated beads 904 to provide a decorative effect. Lights 914A–l may be encased in hollow ones of the beads.

Figure 13:
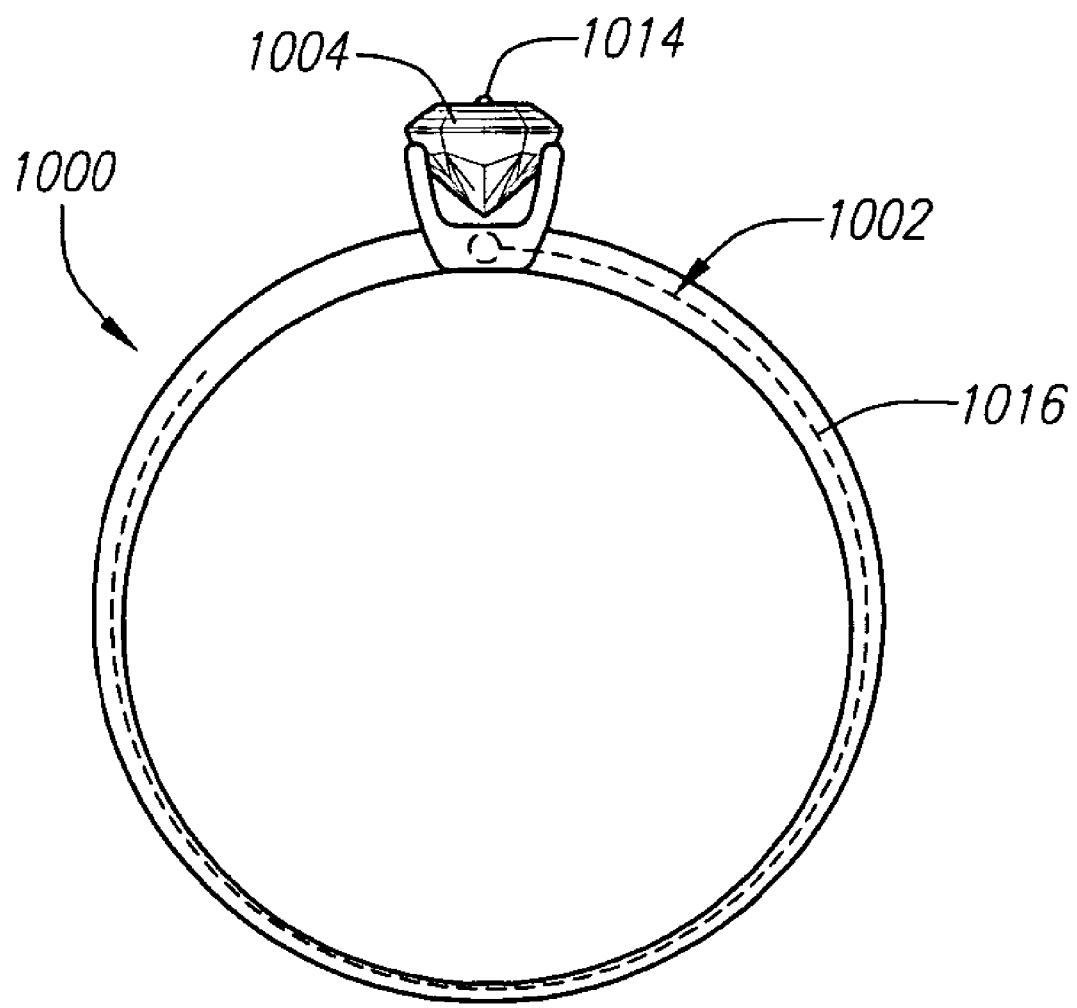
FIG. 13 is a side view showing a ring with alert circuitry according to the invention.

FIG. 13 shows a ring 1000 with alert circuit 1002. An antenna 1016 may be run around a circumference or perimeter of the ring. A light 1014 may be provided on or in a decorative bead 1004. A battery and other circuit components may be housed inside of bead 1004 in a manner similar to other fashion accessories described herein.

Figure 14:
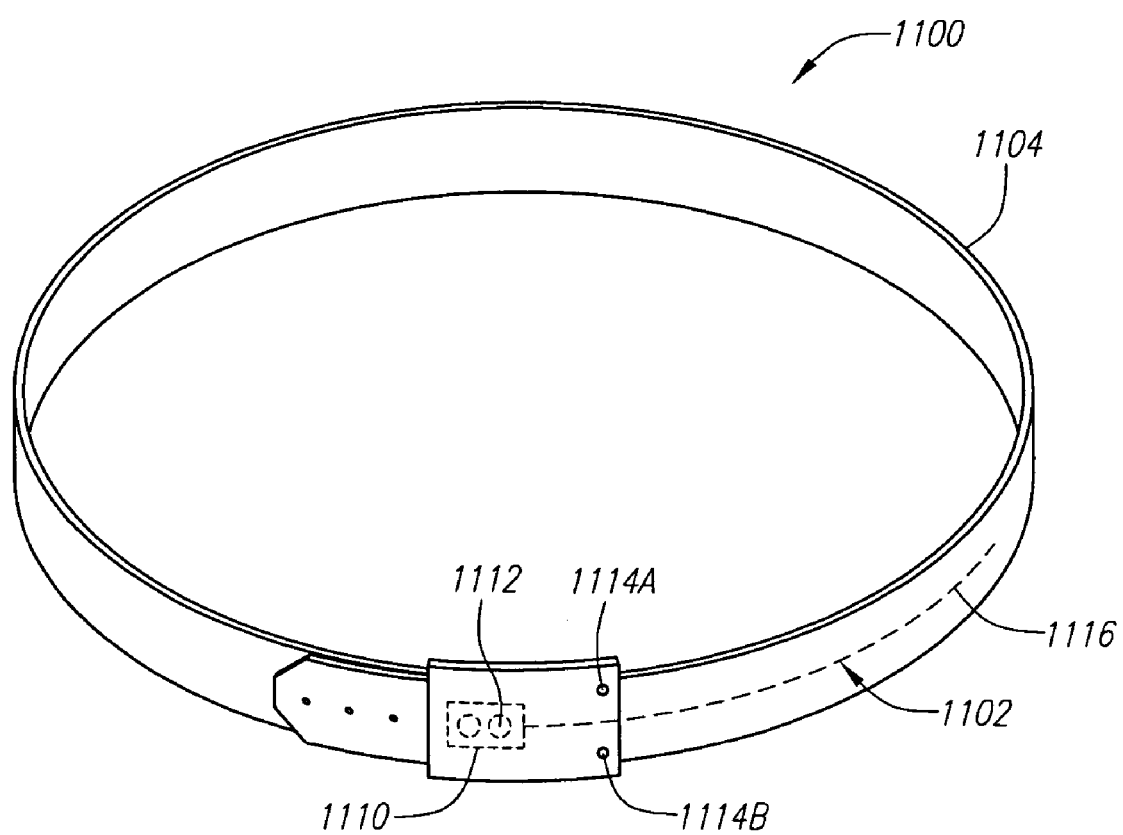
FIG. 14 is a perspective view showing a collar with alert circuitry according to the invention.

FIG. 14 shows a belt 1100 with alert circuit 1102 allied to a conventional belt 1104, such as used for securing trousers. The alert circuit 1102 may comprise a circuit module 1110, battery 1112, and antenna 1116 configured for sensitivity to mobile communication signals within a user's personal space. Any number of lights 1114A–B may be configured to illuminate when a mobile communication signal is detected. The alert circuit may be housed in or on a rigid component of the belt, such as a buckle or bead, providing a portable housing for at least a portion of the alert circuit.

Figure 15:
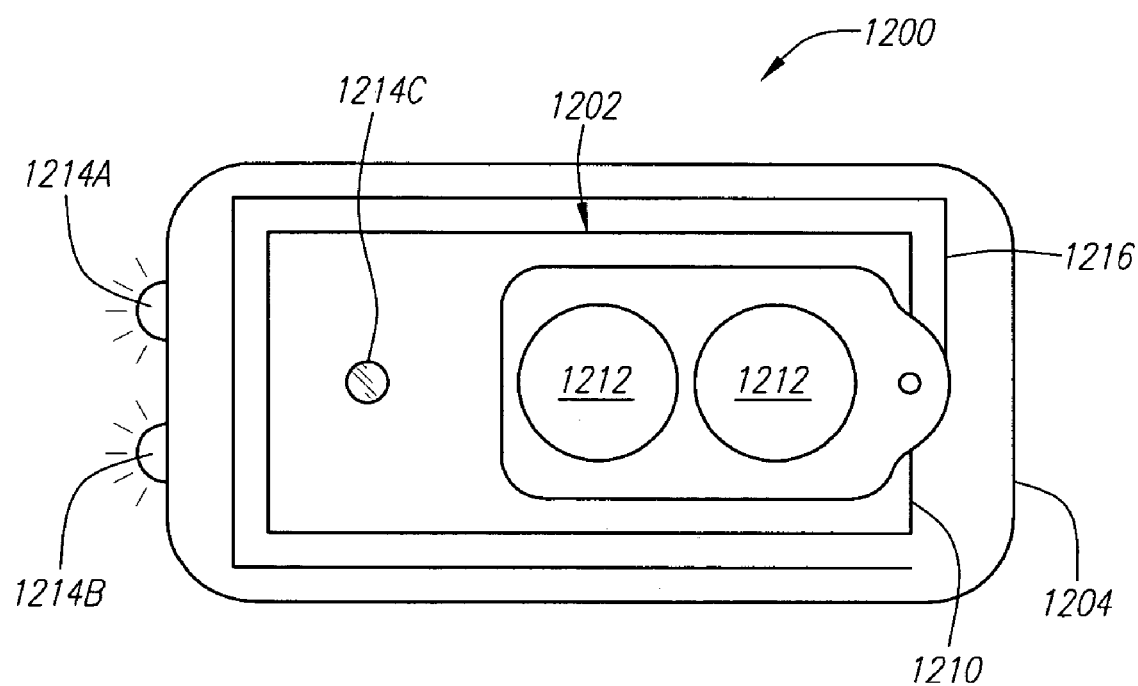
FIG. 15 is a plan view showing a mini-light with alert circuitry according to the invention.

FIG. 15 shows a mini-light 1200, such as configured for attaching to a mobile telephone or other electronic accessory, or for use in a free-standing mode. The mini-light comprises an alert circuit 1202 inside a portable housing 1204, which may be of any desired shape. Any number of LED lamps may be used for regular illumination and as signal lights. In the alternative, or in addition, a signal light 1214C may be dedicated for signaling detection of a mobile communication signal. Antenna 1216 may be disposed around an interior or exterior perimeter of housing 1204. A circuit board 1210 and batteries 1212 of the alert circuit may be disposed in the housing. A manual switch (not shown) may also be provided for operation of the regular lights 1214A–B for illumination purposes. Optionally, the alert circuit 1202 may be configured to operate using the same battery power source as the mini-light, obviating the need for a separate power source.

Figure 16:
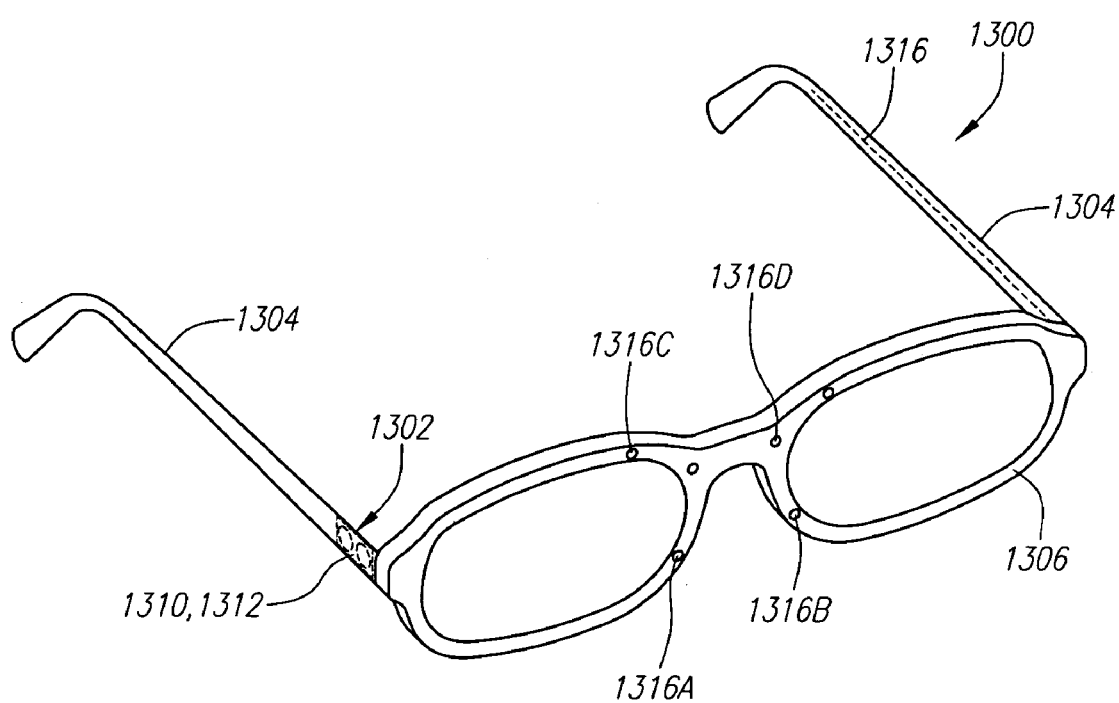
FIG. 16 is a perspective view showing eyeglasses with alert circuitry according to the invention.

FIG. 16 shows a pair of eyeglasses or sunglasses 1300 equipped with an alert circuit 1302. An antenna 1316 may be disposed along one or both ear rests 1304 and frame 1306, or housed inside a hollow frame member. Battery 1312 and circuit module 1310 are configured to illuminate signal lights 1316A–D when a mobile signal is received. Any number of signal lights may be used. For more discrete operation, a light or lights may be disposed on an interior side of frame 1306, where the light will be primarily visible only to the wearer, instead of on the frame exterior as shown.

Figure 17:
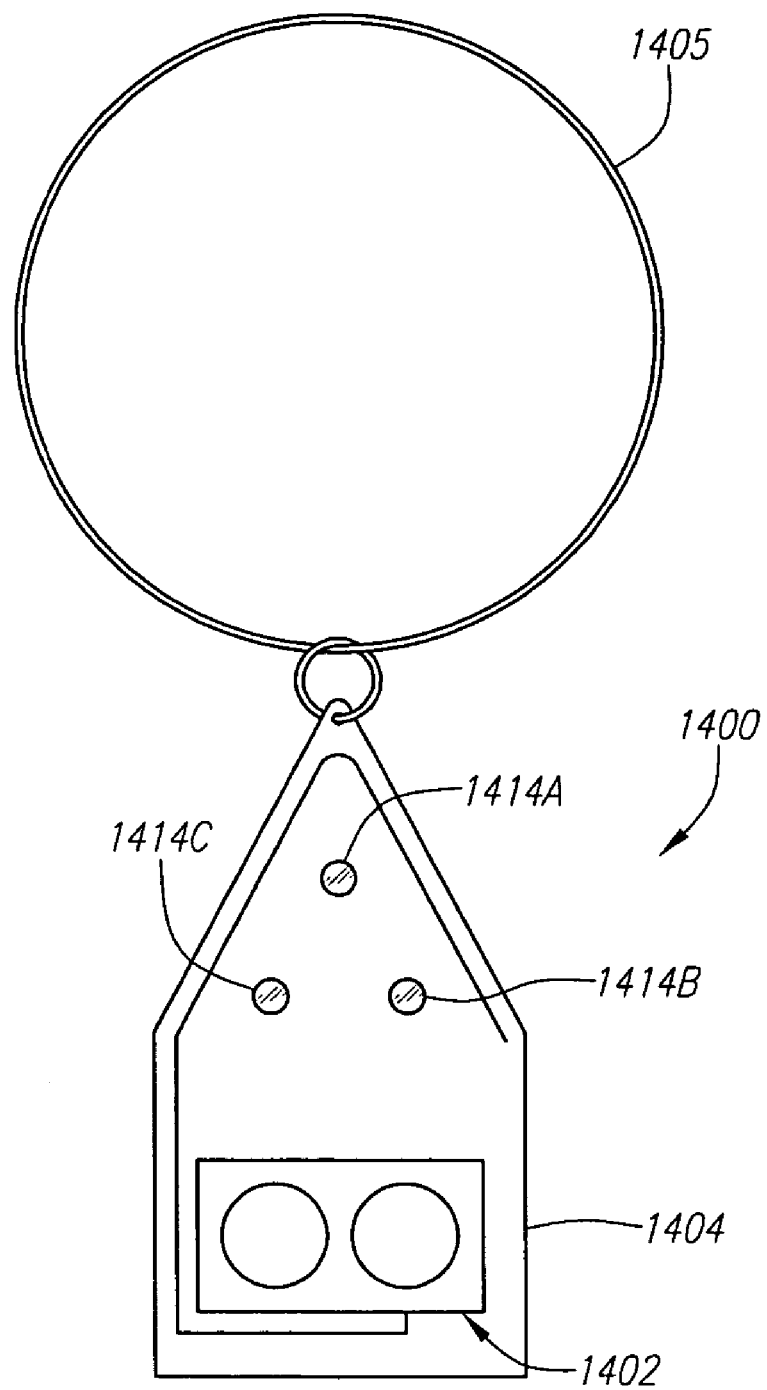
FIG. 17 is a front view showing a pendant with alert circuitry according to the invention.

FIG. 17 shows a charm 1400 with alert circuit 1402, housing 1404 and any number of lights 1414A–C. Charm 1400 may generally be configured similarly to a keychain with alert circuit as previously described. However, charm 1400 should be designed for wearing on a bracelet 1405, anklet, or the like. As such, the charm should be fairly small and decorative in nature. It should be apparent that FIG. 17 is not drawn to scale, in that the charm 1400 is enlarged relative to bracelet 1405.

Figure 18:
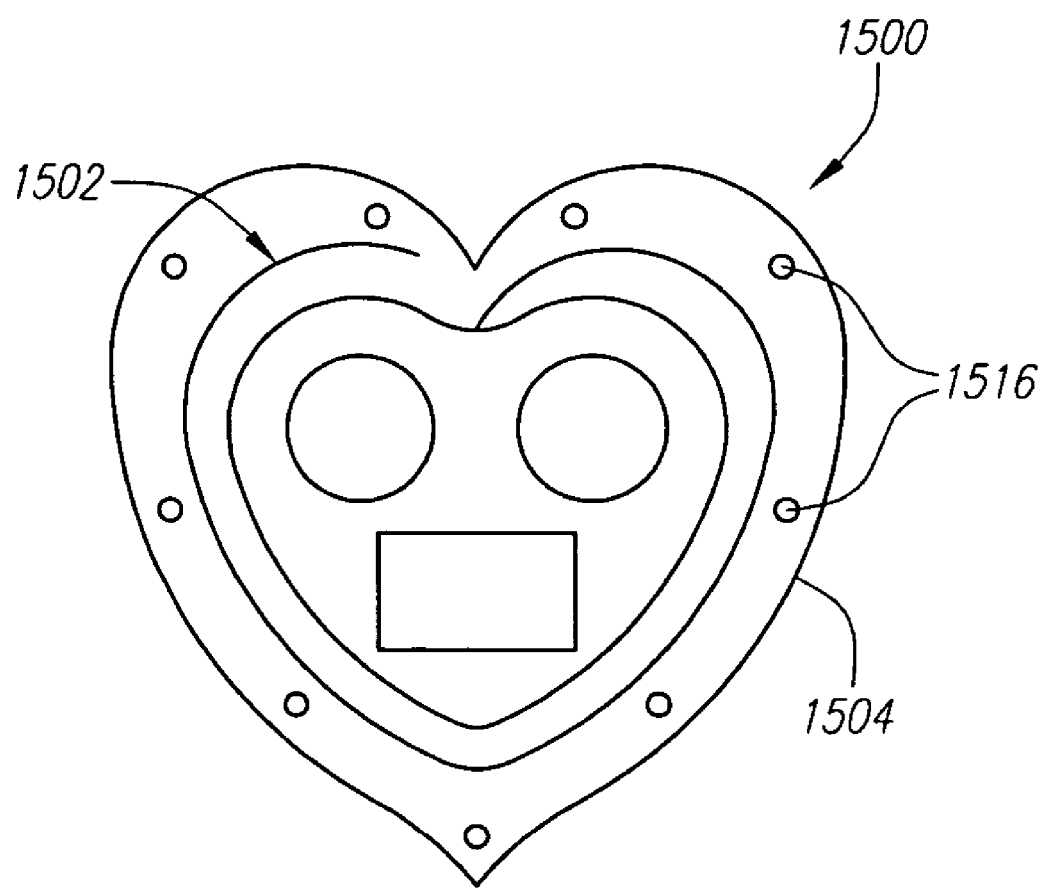
FIG. 18 is a front view showing a heart-shaped brooch with alert circuitry according to the invention.

FIG. 18 shows a heart-shaped charm, brooch, or novelty item 1500 with alert circuit 1502 and portable housing 1504. A plurality of signal lights 1516 are disposed around a perimeter of the heart-shaped housing 1504. The heart 1500 may be configured to clip or pin to an article of clothing or bag, or may be used as a hanging charm.

Figure 19:
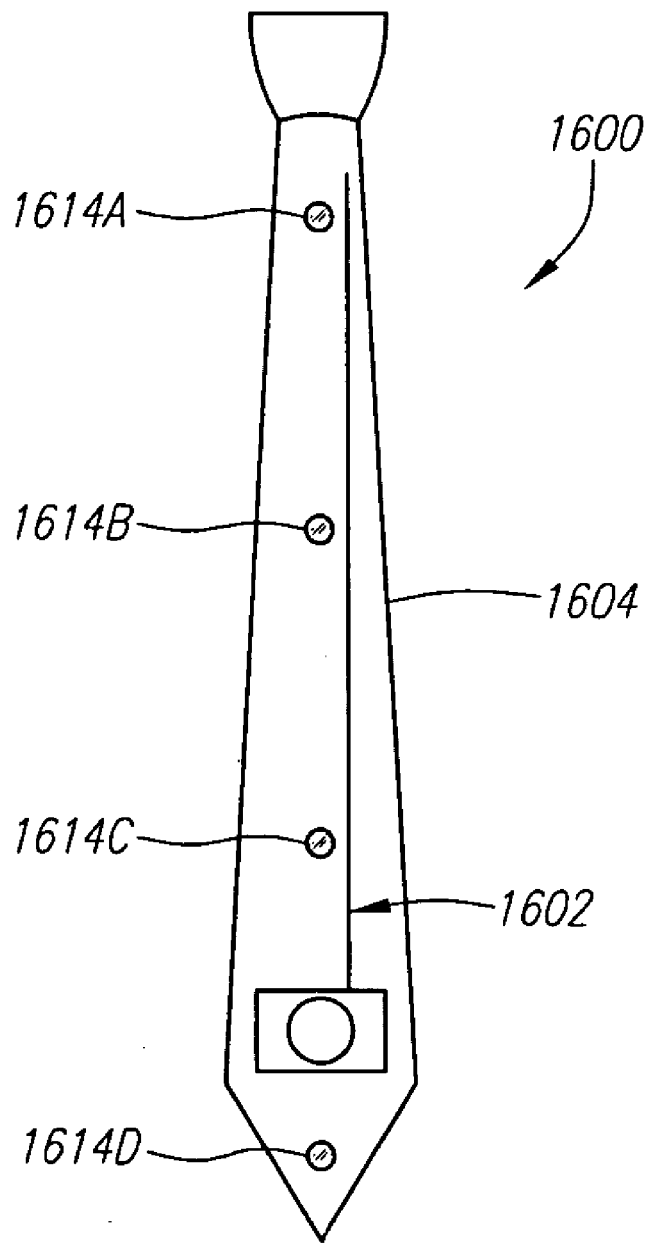
FIG. 19 is a front view showing a necktie with alert circuitry according to the invention.

FIG. 19 shows an article of clothing, namely a necktie 1600, with an internal alert circuit 1602 inside of fabric tie 1604. The fabric tie functions as a portable housing for the alert circuit. One or more alert lights 1614A–D are disposed along a visible portion of the tie.

Figure 20:
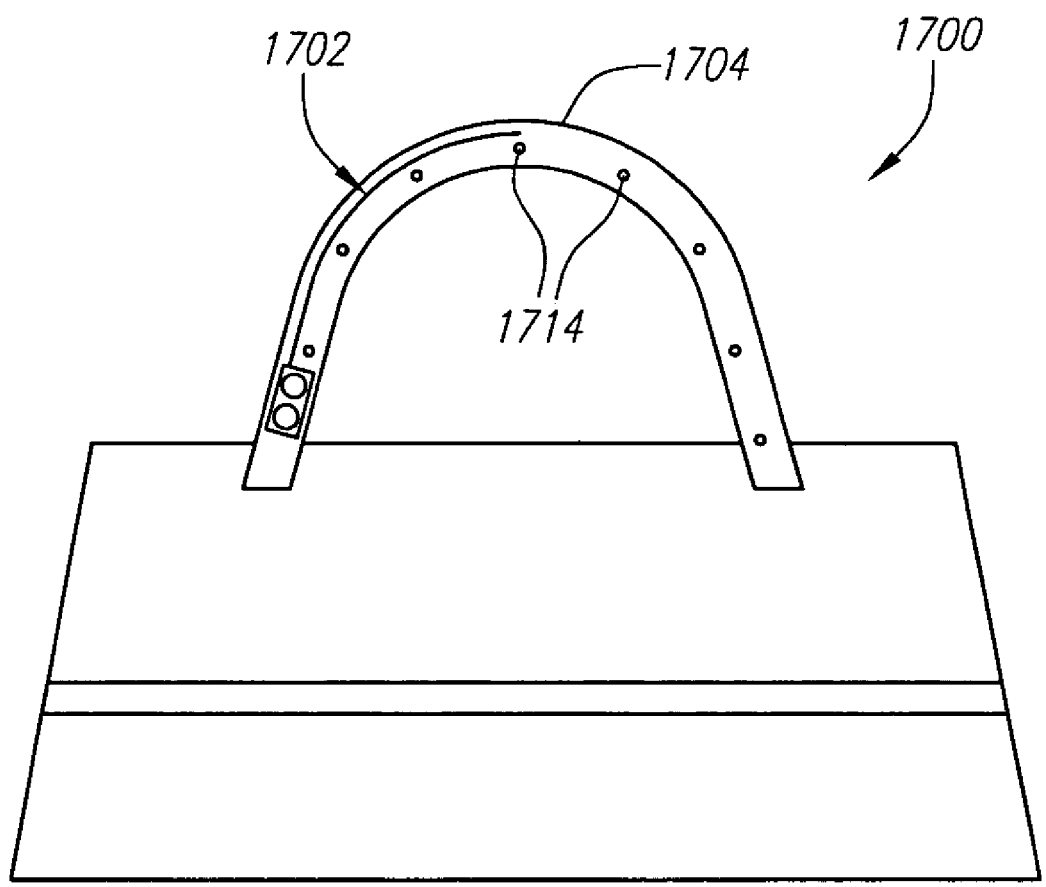
FIG. 20 is a front view showing a purse with alert circuitry according to the invention.

FIG. 20 shows a handbag 1700 with an alert circuit 1702 disposed inside of a handle 1704. Signal lights 1714 may be arranged along handle 1704 or elsewhere on an exterior of hand bag 1700.

Figure 21:
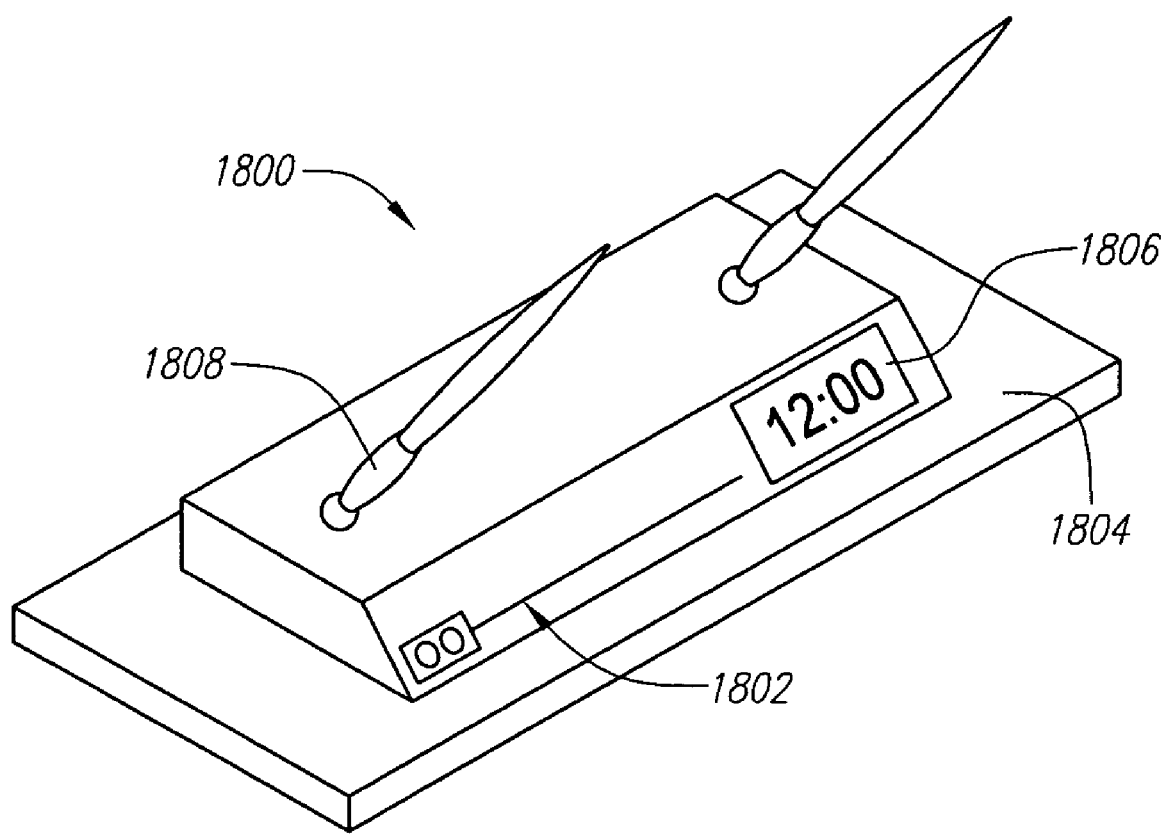
FIG. 21 is a perspective view showing a decorative pen holder and clock with alert circuitry according to the invention.

FIG. 21 shows a desk set 1800 comprising an alert circuit 1802, base or housing 1804, digital clock 1806, and one or more pen holders 1808. Optional digital clock 1806 may be connected to alert circuit 1802 and used as a signaling device. For example, the digital display may be made to flash a message, such as "CELL CALL" when a mobile phone signal is detected by circuit 1802. In the alternative, or in addition, any number of signal lights as previously described may be provided on an exterior of desk set 1800. The desk set 1800 and alert circuit 1802 may be powered by a battery, or in the alternative, may be provided with a power supply and connection to household electric power (not shown).

Figure 22:
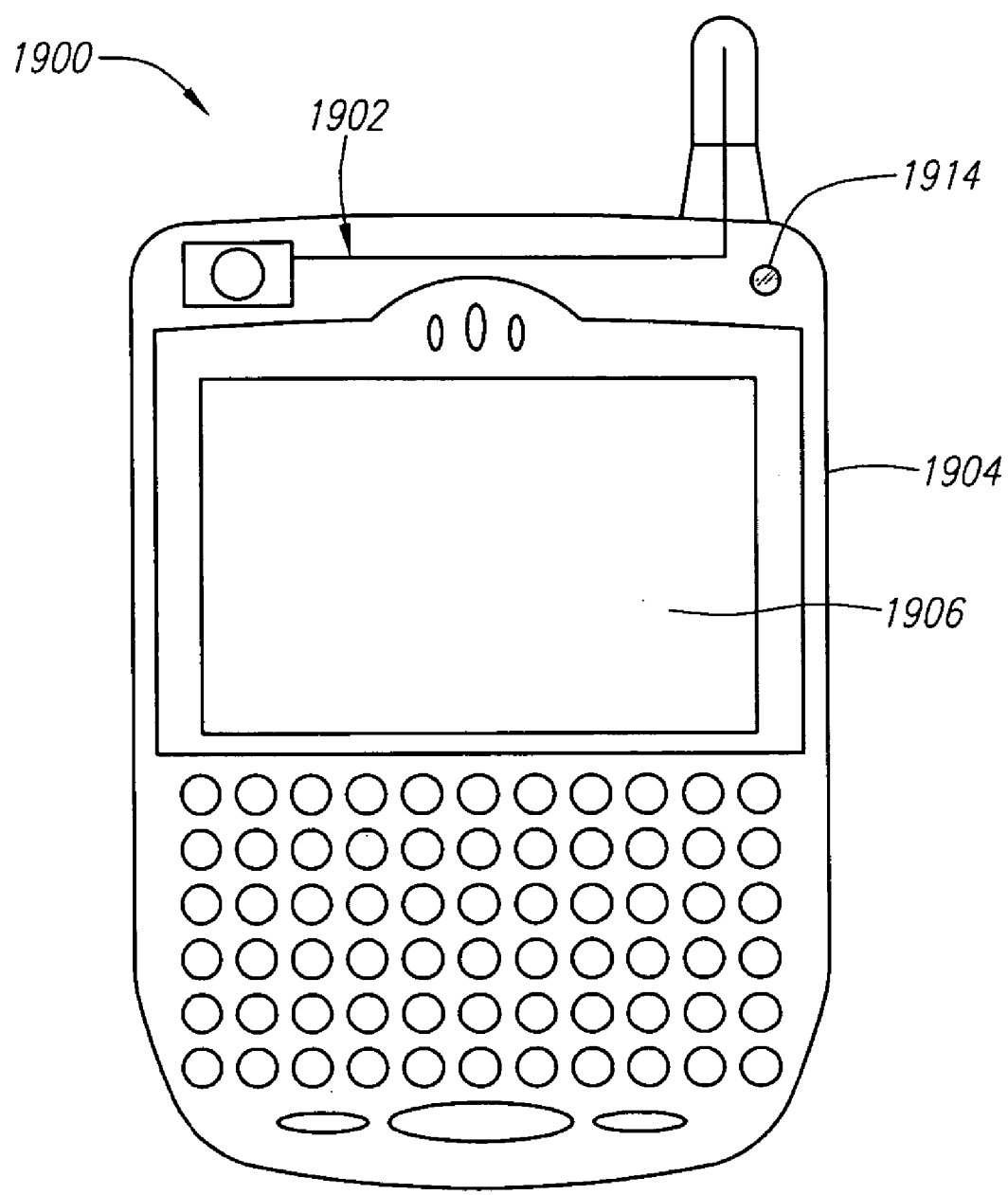
FIG. 22 is a front view showing a hand-held computing device with alert circuitry according to the invention.

FIG. 22 shows a personal digital assistant (PDA) 1900 with an alert circuit 1902 disposed inside a housing 1904. A signal light 1914 may be provided on an exterior of the housing to illuminate when a cellular signal is received. In the alternative, alert circuit 1902 may communicate with a processor for the PDA to display a message or icon on screen 1906 indicating that a call has been received. Optionally, the alert circuit 1902 may be configured to operate using the same battery power source as the PDA instead of using a separate battery.

Figure 23:
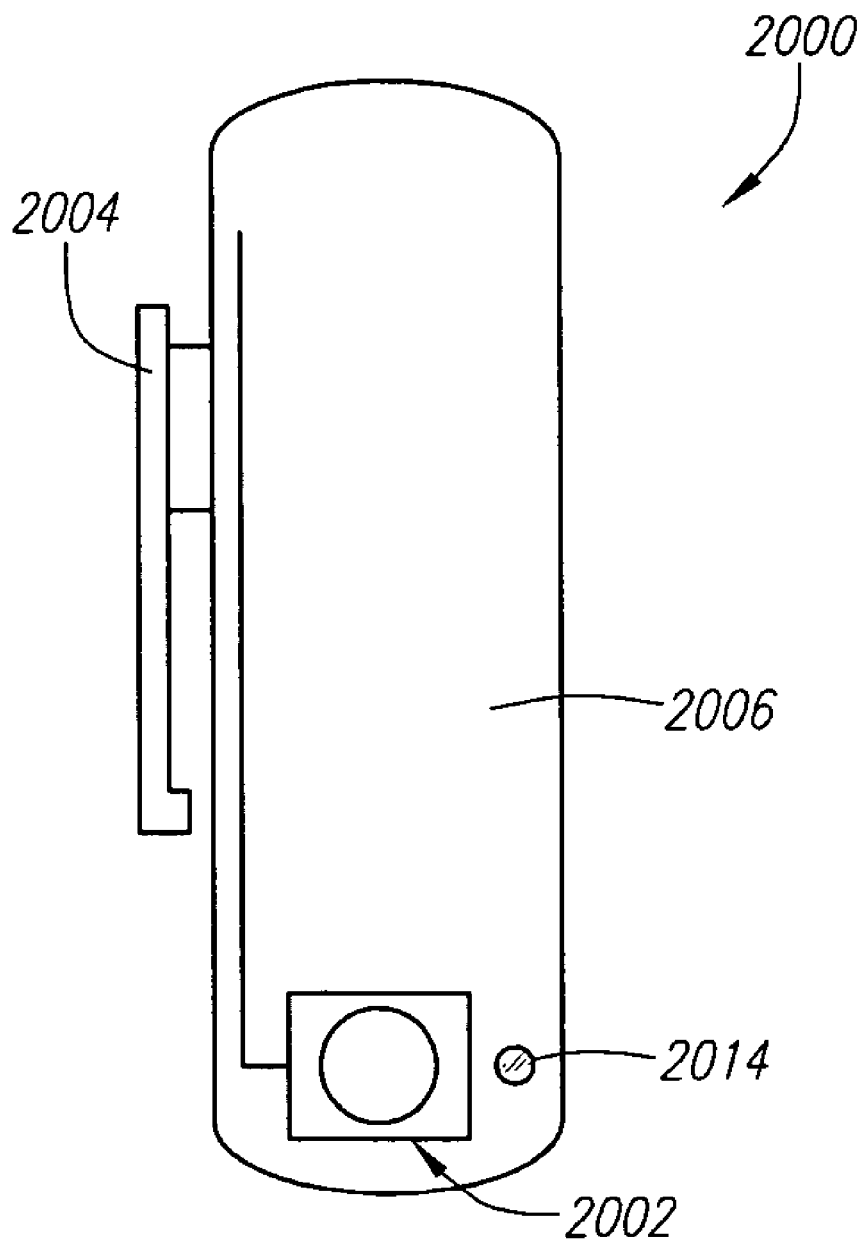
FIG. 23 is a side view showing a clip-on electronic accessory with alert circuitry according to the invention.

FIG. 23 shows a case 2000 for a cellular phone or other electronic device, such as may be clipped to a belt, waistband or strap using clip 2004. An alert circuit 2002 may be provided in a housing 2006 with a signal light 2014 operably associated with the alert circuit.

Figure 24:
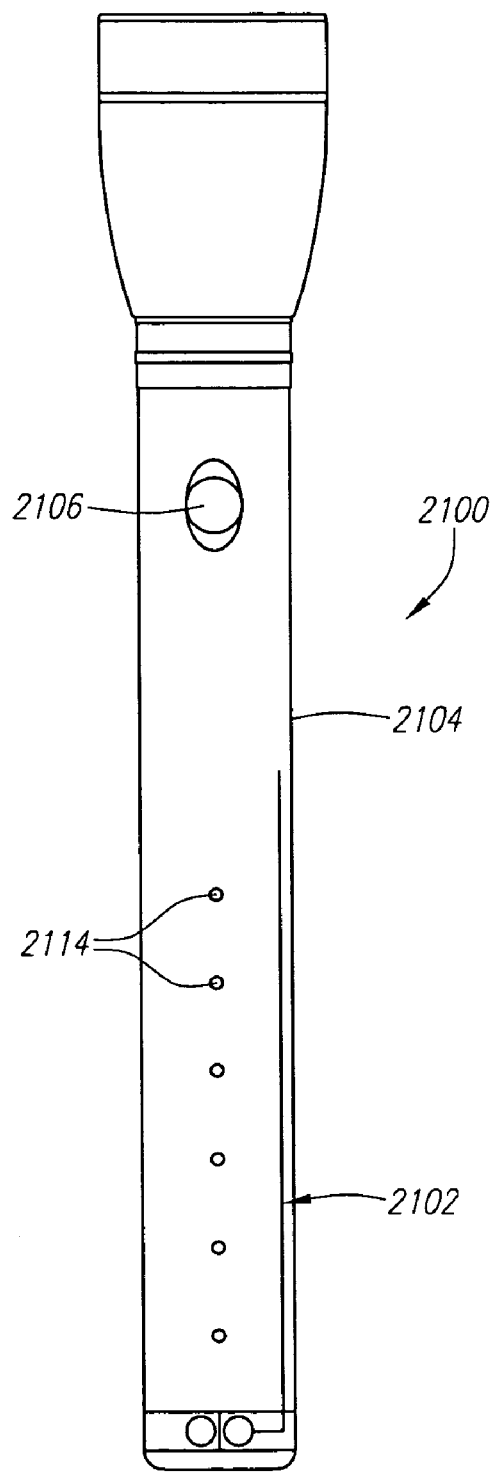
FIG. 24 is a side view showing a flashlight with alert circuitry according to the invention.

FIG. 24 shows a flashlight 2100 with alert circuit 2102 disposed in a housing 2104. An array of signal lights 2114 may be provided along an exterior of the flashlight housing. Switch 2106 may be used for regular operation of the flashlight. Optionally, the alert circuit 2102 may be configured to operate using the same battery power source as the flashlight, obviating the need for a separate power source. For example, both the flashlight and the alert circuit may be configured to operate using power from a rechargeable battery, that may be recharged using a power supply and connection to household or vehicular electric power (not shown). In general, power connections to household or vehicle electric power may be used to power or recharge batteries for alert circuits of any desired article or accessory.

Figure 25:
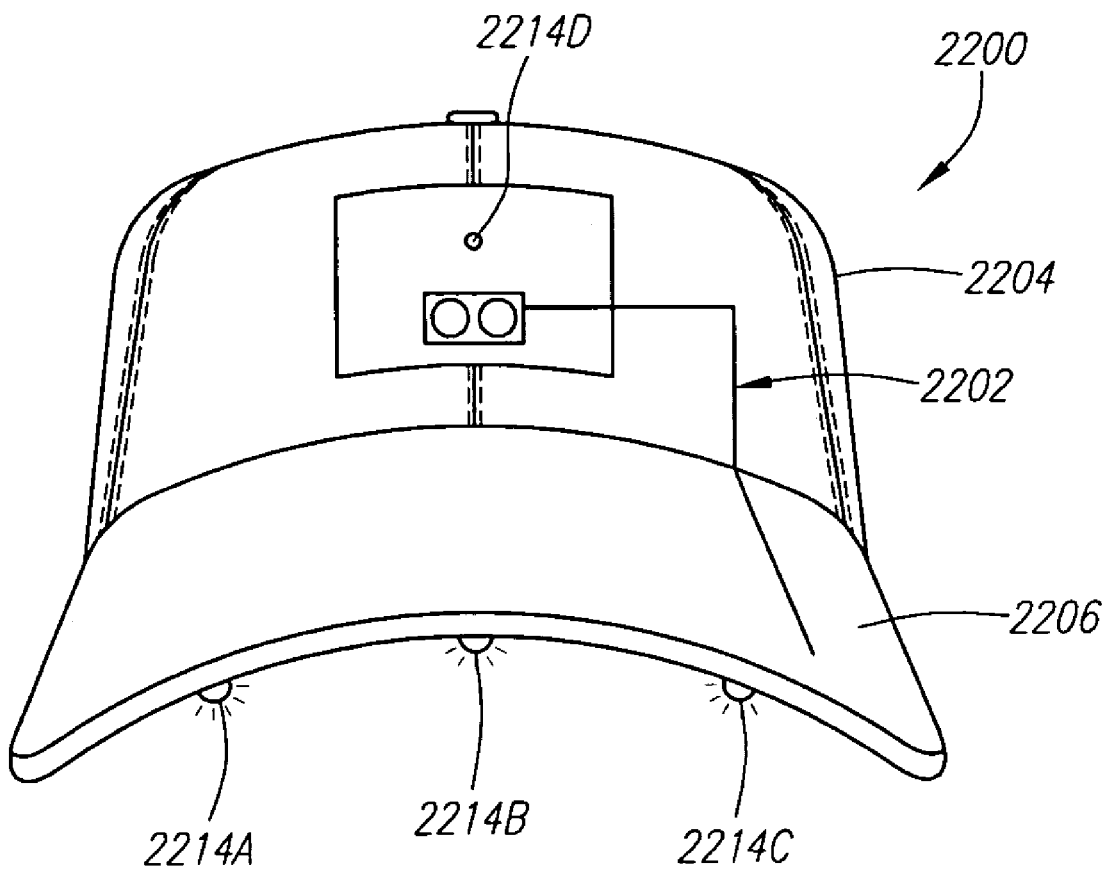
FIG. 25 is a front view showing a cap with alert circuitry according to the invention.

FIG. 25 shows a cap 2200 with alert circuit 2202 incorporated into the fabric 2204 of the cap, wich functions as a wearable portable housing for the alert circuit. Alert lights 2214A–D may be provided at various locations on the cap. For example, locating lights 2214A–C along the lower side of visor 2206 advantageously allows the lights to be seen by the cap wearer, alerting the wearer of an incoming call.

Figure 26:
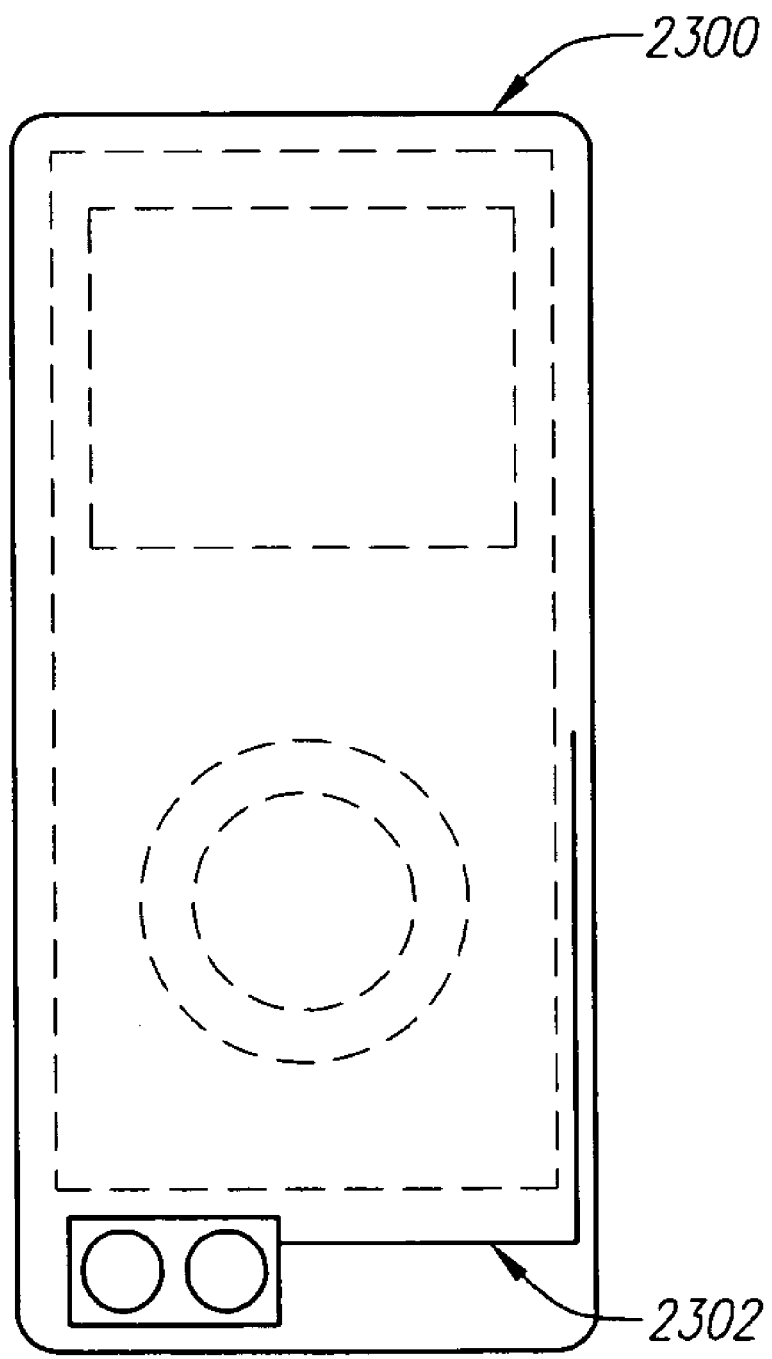
FIG. 26 is a rear view showing a portable digital music player with alert circuitry according to the invention.

FIG. 26 shows a personal electronic device, such as an MP3 music player 2300 with an alert circuit 2302. It should be apparent that various other personal electronic devices may also be suitable for housing alert circuitry. Alert circuit 2302 may be configured similarly to other alert circuits described herein.

Figure 27:
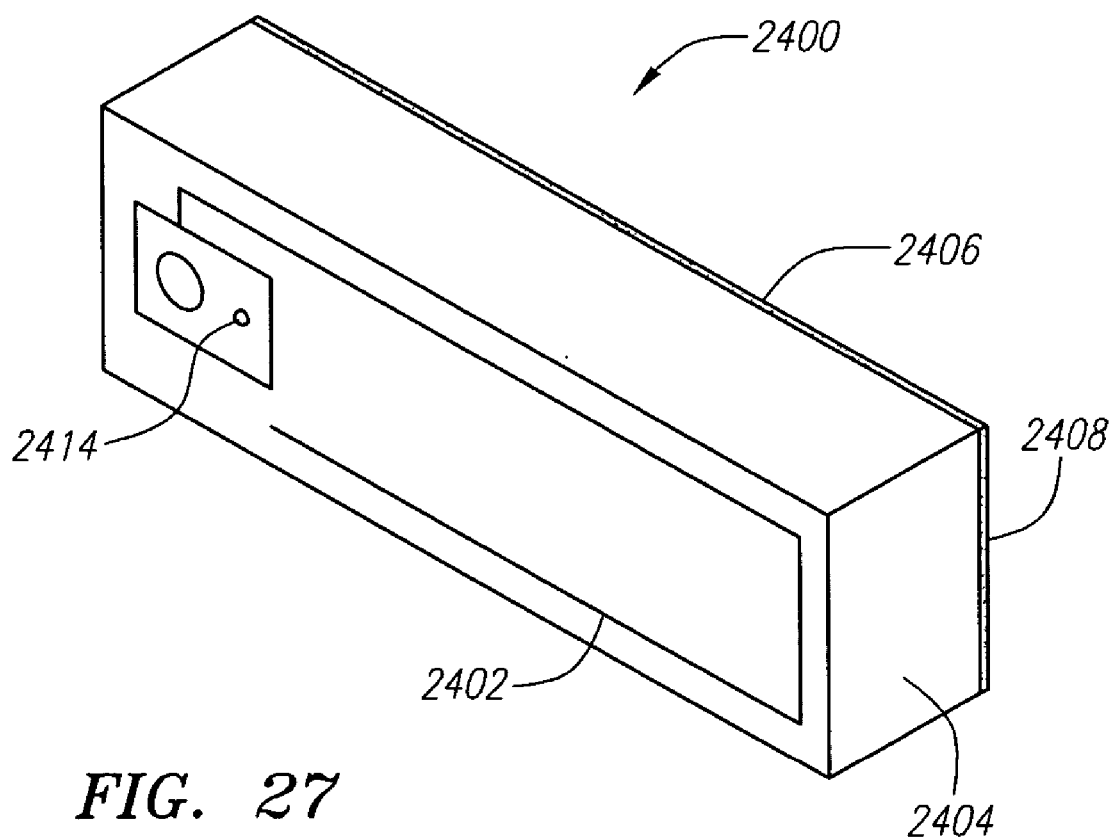
FIG. 27 is a perspective view showing a household accessory such as a desk clock with alert circuitry according to the invention.
Figure 28A:
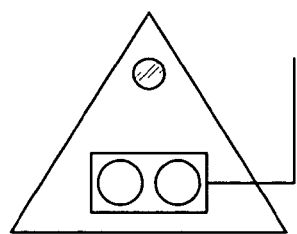
FIGS. 28A–H are front views showing decorative articles of various shapes with alert circuitry according to the invention.
Figure 28B:
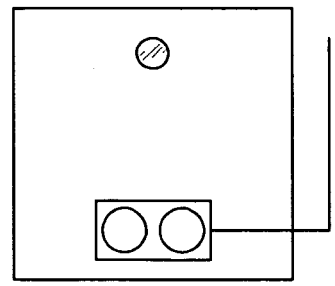
Figure 28C:
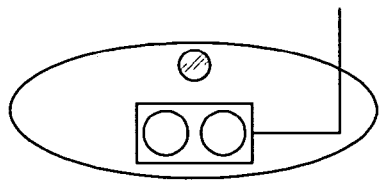
Figure 28D:
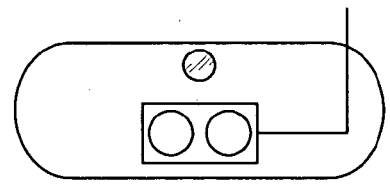
Figure 28E:
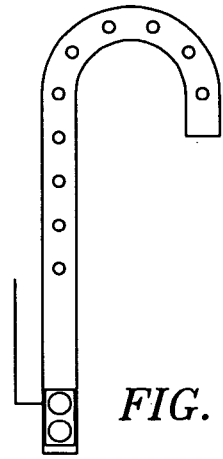
Figure 28F:
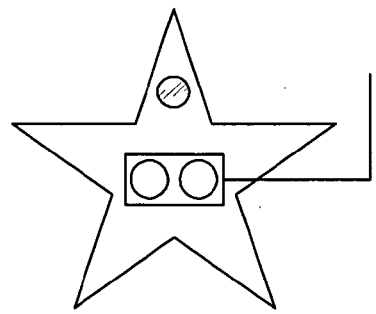
Figure 28G:
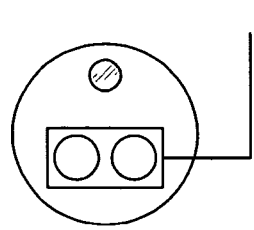
Figure 28H:
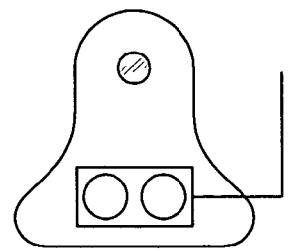

FIG. 27 shows a multi-purpose signaling module 2400. The module comprises a housing 2404 of any desired shape for holding an alert circuit 2402 and at least one signal light 2414 as described herein. A surface 2408 of the housing may be covered by an attachment layer or fastener 2406, such as an adhesive layer, "peel-and-stick" tape or a piece of hook or loop fastener. The signaling module may thereby be attached to any other personal article, for example, picture frames, dashboards, bicycles, motorcycles, and so forth. FIGS. 28A–B illustrate various shapes that may be suitable for a signaling module, charm, brooch, or other personal article. The depicted shapes are merely exemplary, and should not be regarded as limiting the invention.

Figure 29A:
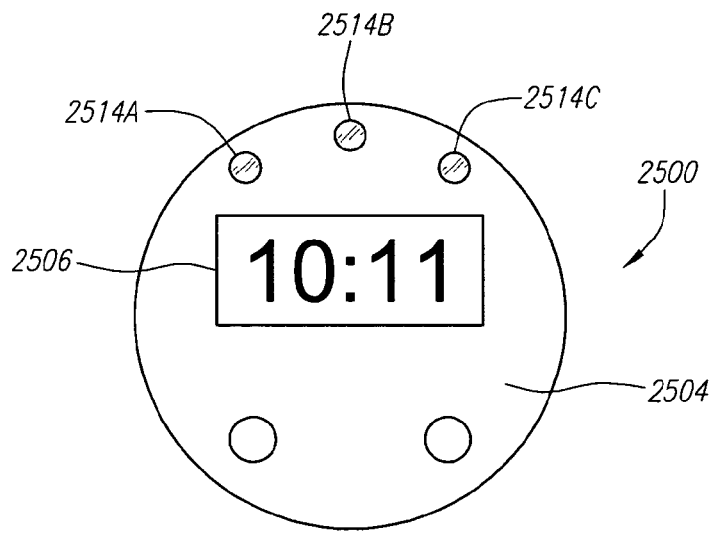
FIGS. 29A–B are front and rear views, respectively, of a clock with alert circuitry according to the invention.
Figure 29B:
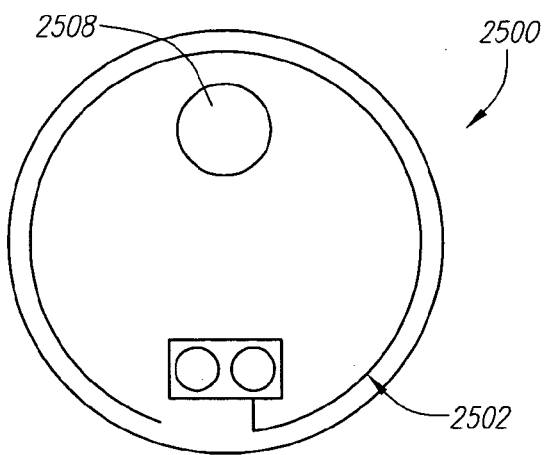

FIGS. 29A–B show an exemplary digital clock 2500 having an alert circuit 2502 disposed in a housing 2504. Signal lights 2514A–C may be used to indicate activation of the alert circuit. In the alternative, or in addition, the digital display 2506 may be connected to the alert circuit 2502 and used as a signaling device. The clock may be powered by its own battery 2508, or may share battery power with alert circuit 2502. A rear surface of the clock may be provided with a stick-on layer or other fastener as described in connection with FIG. 27. For vehicular use, the clock may be configured to be powered or recharged by a connection to a vehicle's electric system (not shown). Likewise, especially for larger clocks and more elaborate light displays, a connection to a household electric system may be desirable.

Figure 30:
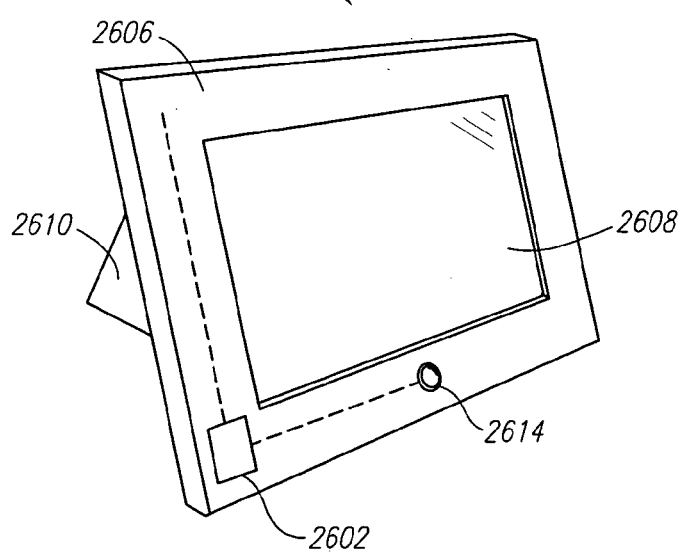
FIG. 30 shows a perspective view of a picture frame with alert circuitry according to the invention.

FIG. 30 shows an exemplary picture frame alerting device 2600 including an alert circuit 2602 as described herein. A signaling light 2614 may be provided on a visible face of frame 2606, or other visible location. Any number or style of lights may be provided. A central display area 2608 may be configured for holding and displaying an image as known in the art. Alerting device 2600 may be provided with a stand 2610 for table-top use. In the alternative, the device may be configured for hanging on a wall. The device 2600 and alert circuit 2602 may be powered by a battery, or in the alternative, may be provided with a power supply and connection to household electric power (not shown).

Having thus described a preferred embodiment of a personal article with a wireless signal alerting device, it should be apparent to those skilled in the art that certain advantages of the within system have been achieved. It should also be appreciated that various modifications, adaptations, and alternative embodiments thereof may be made within the scope and spirit of the present invention. For example, a bracelet using beads as illuminated cases has been illustrated, but it should be apparent that the inventive concepts described above would be equally applicable to other types of fashion accessories, for example, necklaces, brooches, rings, timepieces, and so forth. Further, the invention is not limited to articles to be worn or carried on the person. An article with an alert circuit responsive to mobile communication signals within a personal space of the user may be incorporated into a variety of personal, vehicular, or household items, of which the depicted embodiments are merely exemplary. The invention is further defined by the following claims.

What is claimed is:

1. An article operative to provide a visual alert for the presence of a mobile communication signal from a mobile communication device located within a personal space of a user, the article comprising:

a signaling assembly for providing a visual signal when a mobile communication signal is detected within a defined distance from the signaling assembly;

an portable housing enclosing at least a portion of the signaling assembly, the portable housing configured as a component of an article for personal, vehicular, or household use; and an antenna connected to the signaling assembly and extending for a distance from the signaling assembly in a substantially linear configuration along at least a portion of the portable housing, wherein the article is not connected to the mobile communication device.

2. The article of claim 1, wherein the defined distance is in the range of about one to four feet.

3. The article of claim 1, wherein the defined distance is in the range of about four to twelve feet.

4. The article of claim 1, wherein the signaling assembly comprises a circuit module, that when placed on or adjacent to a user, is operative provide the visual signal when generally any operative GSM or TDMA mobile communication device located within a personal space of the user receives an incoming signal, and to not respond when like mobile communication devices located outside the personal space of the user receive an incoming signal.

5. The article of claim 4, wherein the circuit module further comprises a sensor chip operative to sense activation of the antenna by a mobile communication signal, a light-emitting diode connected to the sensor chip, and a battery connected to the sensor chip.

6. The article of claim 4, wherein the antenna extends from the circuit module for a length of at least about one inch and not greater than about four inches.

7. The article of claim 4, wherein the antenna extends from the circuit module for a length of at least about four inches and not greater than about twenty inches.

8. The article of claim 1, wherein the portable housing comprises a tubular member encasing the antenna for at least a portion of the distance extending from the signaling assembly.

9. The article of claim 1, wherein the portable housing comprises at least a portion of a bracelet.

10. The article of claim 1, wherein the portable housing comprises at least a portion of a necklace.

11. The article of claim 1, wherein the portable housing comprises at least a portion of a wristwatch.

12. The article of claim 1, wherein the portable housing comprises at least a portion of an animal-shaped toy.

13. The article of claim 1, wherein the portable housing comprises at least a portion of a beverage receptacle.

14. The article of claim 1, wherein the portable housing comprises at least a portion of a keychain.

15. The article of claim 1, wherein the portable housing comprises at least a portion of a mini-light.

16. The article of claim 1, wherein the portable housing comprises at least a portion of a pendant.

17. The article of claim 1, wherein the portable housing comprises at least a portion of a brooch.

18. The article of claim 1, wherein the portable housing comprises at least a portion of an article of clothing.

19. The article of claim 18, wherein the article of clothing comprises a cap.

20. The article of claim 1, further comprising an attachment layer covering at least a portion of a surface of the portable housing, the attachment layer configured for attaching the article to another object.

* * * * *